US012754549B2

(12) United States Patent
Pratt, Jr. et al.

(10) Patent No.: US 12,754,549 B2
(45) Date of Patent: Oct. 6, 2026

(54) AUTONOMOUS VEHICLE FOR AIRPORTS

(71) Applicant: PATTERN LABS, Erie, CO (US)

(72) Inventors: John Charles Pratt, Jr., Superior, CO (US); Jacob Saul Blacksberg, Boulder, CO (US); Kellen Schroeter, Nederland, CO (US); Andrew Mularoni, Superior, CO (US); Corinne Kenwood, Boulder, CO (US); Josh Wende, Boulder, CO (US); Andrew Hoffman, Morrison, CO (US); Arjun Gandhi, Boulder, CO (US); John Klinger, Louisville, CO (US)

(73) Assignee: PATTERN LABS, Erie, CO (US)

( * ) Notice: Subject to any disclaimer, the term of this patent is extended or adjusted under 35 U.S.C. 154(b) by 440 days.

(21) Appl. No.: 18/303,985

(22) Filed: Apr. 20, 2023

(65) Prior Publication Data

US 2023/0341859 A1 Oct. 26, 2023

Related U.S. Application Data

(60) Provisional application No. 63/333,023, filed on Apr. 20, 2022.

(51) Int. Cl.

*G05D 1/622* (2024.01)
*B64F 1/36* (2017.01)
(Continued)

(52) U.S. Cl.

CPC .......... *G05D 1/0214* (2013.01); *B64F 1/368* (2013.01); *G05D 1/0223* (2013.01);
(Continued)

(58) Field of Classification Search

CPC .. G05D 1/0214; G05D 1/0223; G05D 1/0238; G05D 1/024; G05D 1/242;
(Continued)

(56) References Cited

U.S. PATENT DOCUMENTS 11,126,944 B1 * 9/2021 Aggarwal ............ G06F 9/4887
11,348,269 B1 * 5/2022 Ebrahimi Afrouzi ... G01S 17/48
(Continued)

FOREIGN PATENT DOCUMENTS

EP 2821324 A1 1/2015
GB 2576800 A 3/2020
(Continued)

OTHER PUBLICATIONS

Machine translation of KR 20210111052 A (Year: 2021).*
(Continued)

*Primary Examiner* — Dino Kujundzic
(74) *Attorney, Agent, or Firm* — Michael Best & Friedrich LLP

(57) ABSTRACT

Systems and methods provide an autonomous vehicle for operation in an airport. The autonomous vehicle includes a frame, a platform coupled to the frame and configured to support a load, a plurality of obstacle depth sensors positioned relative to the frame and together configured to detect obstacles 360 degrees about the frame, an obstacle planar sensor positioned relative to the frame and configured to detect obstacles in a horizontal plane about the frame, and an electronic processor coupled to the plurality of obstacle depth sensors and the obstacle planar sensor. The electronic processor is configured to operate the autonomous vehicle based on obstacles detected by the plurality of obstacle depth sensors and the obstacle planar sensor.

17 Claims, 14 Drawing Sheets

(51) Int. Cl.
*G05D 1/00* (2006.01)
*G05D 1/242* (2024.01)
*G05D 1/633* (2024.01)
*G05D 1/667* (2024.01)

(52) U.S. Cl.
CPC ........... *G05D 1/0238* (2013.01); *G05D 1/242* (2024.01); *G05D 1/622* (2024.01); *G05D 1/633* (2024.01); *G05D 1/667* (2024.01)

(58) Field of Classification Search
CPC ........ G05D 1/246; G05D 1/622; G05D 1/633; G05D 1/65; G05D 1/667; G05D 1/69; G01S 17/93
See application file for complete search history.

(56) References Cited

U.S. PATENT DOCUMENTS

| | | | | |
|---|---|---|---|---|
| 11,498,587 | B1 * | 11/2022 | Mitlin | G05D 1/0214 |
| 2012/0083960 | A1 * | 4/2012 | Zhu | B60R 1/23 701/23 |
| 2014/0074287 | A1 * | 3/2014 | LaFary | G05D 1/0274 700/253 |
| 2014/0365258 | A1 * | 12/2014 | Vestal | G06Q 10/063114 901/1 |
| 2017/0197643 | A1 * | 7/2017 | Gariepy | G05D 1/0238 |
| 2018/0068206 | A1 * | 3/2018 | Pollach | G06V 20/56 |
| 2019/0179329 | A1 * | 6/2019 | Keivan | G05D 1/0221 |
| 2019/0180467 | A1 * | 6/2019 | Li | G01S 17/93 |
| 2020/0033872 | A1 | 1/2020 | Burch, V et al. | |
| 2020/0331630 | A1 | 10/2020 | Ricaud | |
| 2021/0122262 | A1 | 4/2021 | Gaussin | |
| 2021/0256722 | A1 * | 8/2021 | Staab | G01S 17/894 |
| 2021/0302582 | A1 * | 9/2021 | Liu | G01S 17/93 |
| 2022/0024603 | A1 | 1/2022 | Keene et al. | |
| 2022/0087884 | A1 | 3/2022 | Takei et al. | |
| 2022/0398851 | A1 * | 12/2022 | Nehmadi | G01S 7/4808 |
| 2023/0186494 | A1 * | 6/2023 | Bosse | G06V 20/56 345/424 |

FOREIGN PATENT DOCUMENTS

| | | | | |
|---|---|---|---|---|
| KR | 20210111052 | A * | 9/2021 | G06V 10/46 |
| WO | 2021053568 | A1 | 3/2021 | |

OTHER PUBLICATIONS

Alke, "Electric Vehicles ATX11OE, ATX21OE, ATX2303/ED/H/HL, ATX24OE/ED/H/HL," catalog © 2016 (8 pages).
Alke, "Technical Specs—ATX11OE," specification © 2013 (3 pages).
Invitation to Pay Additional Fees issued in Application No. PCT/US2023/065999 dated Jul. 11, 2023 (14 pages).
International Search Report and Written Opinion for Application No. PCT/US2023/065999 dated Sep. 1, 2023 (19 pages).

* cited by examiner

AUTONOMOUS VEHICLE FOR AIRPORTS

BACKGROUND

Airlines use several vehicles at airports to handle day-to-day operations. These operations include moving personnel, passengers, baggage, fuel, equipment, supplies, and the like around the airport. Currently, manually operated vehicles are used for these operations. However, manually operated vehicles are susceptible to scheduling conflicts, human error, and other factors that increase the cost and reduce the efficiency of operations. One way to overcome these drawbacks is to use autonomous vehicles, such as those used on public roadways, in airports.

SUMMARY

Autonomous vehicles use the infrastructure of public roadways, for example, lane markings, traffic lights, traffic signs, live traffic visualization, and the like for self-guidance. However, such infrastructure is absent in airports or if present is vastly different from public roadways. Using autonomous vehicles that are generally operated on public roadways in airports therefore may not lead to the cost and efficiency gains from replacing manually operated vehicles.

Accordingly, there is a need for autonomous vehicles that can be used in airports.

One embodiment provides an autonomous vehicle for operation in an airport. The autonomous vehicle a frame; a platform coupled to the frame and configured to support a load; an obstacle sensor positioned relative to the frame and configured to detect obstacles about the frame; and an electronic processor coupled to the obstacle sensor and configured to operate the autonomous vehicle based on obstacles detected by the obstacle sensor.

In some aspects, the obstacle sensor is mounted to the frame below the platform at a front of the autonomous vehicle.

In some aspects, the electronic processor is configured to determine a measured value of a movement parameter of the autonomous vehicle; determine a planned value of a movement parameter of the autonomous vehicle; determine a collision based on an obstacle detected by the obstacle sensor and at least one of the measured value and the planned value; and perform an action to avoid the collision.

In some aspects, the action includes one selected from a group consisting of applying brakes of the autonomous vehicle and applying a steering of the autonomous vehicle.

In some aspects, the obstacle sensor is an obstacle planar sensor configured to detect obstacles in a horizontal plane about the frame.

In some aspects, the autonomous vehicle further includes a plurality of obstacle planar sensors positioned relative to the frame and configured to provide overlapping sensor coverage around the autonomous vehicle, wherein the obstacle planar sensor is one of the plurality of obstacle planar sensors.

In some aspects, the plurality of obstacle planar sensors provides sensor coverage along multiple planes.

In some aspects, the plurality of obstacle planar sensors includes four obstacle planar sensors mounted at four corners at a bottom of the frame and two obstacle planar sensors mounted at a rear and a top of the autonomous vehicle, wherein the obstacle planar sensor is one of the four obstacle planar sensors.

In some aspects, the obstacle sensor is a planar LiDAR sensor.

In some aspects, the autonomous vehicle further includes a plurality of obstacle depth sensors positioned relative to the frame and together configured to detect obstacles 360 degrees about the frame.

In some aspects, the obstacle planar sensor includes overlapping sensor coverage area with the plurality of obstacle depth sensors.

In some aspects, the electronic processor is further configured to: detect obstacles in sensor data captured by the plurality of obstacle depth sensors; and receive, from the obstacle planar sensor, obstacle information not detected in the sensor data captured by the plurality of obstacle depth sensors of the overlapping sensor coverage area.

In some aspects, the electronic processor is further configured to reduce a speed of the autonomous vehicle in response to receiving the obstacle information.

In some aspects, the electronic processor is further configured to generate an alert in response to receiving the obstacle information.

In some aspects, the plurality of obstacle depth sensors includes a plurality of three-dimensional (3D) image sensors.

In some aspects, the electronic processor is configured to: receive a global path plan of the airport; receive task information for a task to be performed by the autonomous vehicle; determine a task path plan based on the task information; and execute the task path plan by navigating the autonomous vehicle.

In some aspects, for executing the task path plan, the electronic processor is configured to: generate a fused point cloud based on sensor data received from a first sensor and a second sensor; detect an object based on the fused point cloud; process obstacle information associated with the first object relative to a current position of the autonomous vehicle; determine whether the object is in a planned path of the autonomous vehicle; in response to determining that the object is in the planned path, alter the planned path to avoid the object; and in response to determining that the object is in a vicinity of the autonomous vehicle but not in the planned path, continue executing the planned path.

In some aspects, the first sensor is three-dimensional (3D) long-range sensor and the second sensor is a plurality of obstacle depth sensors.

In some aspects, the autonomous vehicle further includes a memory storing a machine learning module, wherein, using the machine learning module, the electronic processor is further configured to receive second sensor data from a third sensor, identify an object in an environment surrounding the autonomous vehicle based on the second sensor data, and determine a classification of the object.

In some aspects, using the machine learning module, the electronic processor is further configured to predict a trajectory of the object based on the classification of the object, and predict, based on the trajectory, whether the object will be an obstacle in the planned path of the autonomous vehicle, and in response to predicting that the object will be an obstacle in the planned path of the autonomous vehicle, alter the planned path to avoid the obstacle.

In some aspects, the classification includes at least one selected from the group consisting of a stationary object and a non-stationary object.

In some aspects, the third sensor is one selected from the group consisting of the plurality of obstacle depth sensors and a video camera, wherein the video camera is mounted at a front to capture video along a path of the autonomous vehicle.

Another embodiment provides a method for managing a fleet of autonomous vehicles in an airport. The method includes determining, using a server electronic processor included in a fleet management server, an itinerary associated with an aircraft; retrieving, using the server electronic processor, a task related to the aircraft; selecting, using the server electronic processor, an autonomous vehicle included in the fleet of autonomous vehicles for execution of the task; determining whether to transmit task information based on the task to one of an autonomous vehicle or a human operator; in response to determining to transmit the task information an autonomous vehicle, transmitting the task information based on the task to an autonomous vehicle included in the fleet of autonomous vehicles; determining, with a vehicle electronic processor included in the autonomous vehicle, a task path plan based on the task information; and autonomously executing, using the vehicle electronic processor, the task path plan.

In some aspects, the method further includes receiving, with the vehicle electronic processor, a global path plan, wherein the global path plan includes a map of the airport, the map of the airport including at least one selected from the group consisting of a location of drivable paths, location of landmarks, traffic patterns, traffic signs, and speed limits in the airport.

In some aspects, the task includes at least on selected from the group consisting of loading baggage, unloading baggage, loading supplies, unloading supplies, and recharging, and the autonomous vehicle is selected based on the task.

In some aspects, the task path plan includes a driving path between a current location of the autonomous vehicle and a second location, wherein the second location includes at least one selected from the group consisting of a baggage pick up or drop off location, a gate location, a charging location, a cargo container pickup location, and a maintenance point.

Another embodiment provides an autonomous vehicle for operation in an airport. The autonomous vehicle includes: a frame; a platform coupled to the frame and configured to support a load, an obstacle sensor mounted to the frame and configured to detect objects within a path of the autonomous vehicle; an electronic processor coupled to the obstacle sensor; a memory storing a machine learning module, wherein, using the machine learning module, the electronic processor is configured to receive sensor data from the obstacle sensor, identify an object in an environment surrounding the autonomous vehicle based on the sensor data, and determine a classification of the object.

In some aspects, using the machine learning module, the electronic processor is further configured to predict a trajectory of the object based on the classification of the object, and predict, based on the trajectory, whether the object will be an obstacle in a planned path of the autonomous vehicle, and in response to predicting that the object will be the obstacle in the planned path of the autonomous vehicle, alter the planned path to avoid the obstacle.

In some aspects, the classification includes at least one selected from the group consisting of a stationary object and a non-stationary object.

In some aspects, the obstacle sensor is a plurality of obstacle depth sensors mounted to the frame and together configured to detect obstacles 360 degrees about the frame.

In some aspects, the obstacle sensor is at least one selected from the group consisting of a video camera mounted at a front of the frame to capture video along a path of the autonomous vehicle and a 3D LiDAR sensor.

In some aspects, altering the planned path includes one selected from a group consisting of applying brakes of the autonomous vehicle and applying a steering of the autonomous vehicle.

Another embodiment provides an autonomous vehicle for operation in an airport. The autonomous vehicle includes: a frame; a platform coupled to the frame and configured to support a load; a plurality of obstacle sensors mounted to the frame and configured to detect obstacles about the autonomous vehicle; an electronic processor coupled to the plurality of obstacle sensors and configured to receive sensor data from the plurality of obstacle sensors, determine, using a first obstacle detection layer on the sensor data, a first obstacle in a planned path of the autonomous vehicle based on a predicted trajectory of a detected object, determine, using a second obstacle detection layer on the sensor data, a second obstacle in the planned path based on geometric obstacle detection, and determine, using a third obstacle detection layer on the sensor data, a third obstacle in the planned path based on planar obstacle detection, perform an action to avoid collision with at least one of the first obstacle, the second obstacle, and the third obstacle in the planned path of the autonomous vehicle.

In some aspects, the electronic processor is configured to determine a classification of the detected object, and determine the predicted trajectory at least based on the classification.

In some aspects, the electronic processor is configured to determine the predicted trajectory using a machine learning module.

In some aspects, the action includes at least one selected from the group consisting of altering the planned path of the autonomous vehicle, applying brakes of the autonomous, and requesting teleoperator control of the autonomous vehicle.

In some aspects, the electronic processor is configured to alter the planned path of the autonomous vehicle in response to determining at least one of the first obstacle or the second obstacle, and apply the brakes of the autonomous vehicle in response to determining the third obstacle.

Another embodiment provides an autonomous vehicle for operation in an airport. The autonomous vehicle includes: a frame; a platform coupled to the frame and configured to support a load; a plurality of sensors including a first sensor and a second sensor; an electronic processor coupled to the plurality of sensors and configured to: receive a global path plan; generate a fused point cloud based on sensor data received from a first sensor and a second sensor; detect an object based on the fused point cloud; process obstacle information associated with the object relative to a current position of the autonomous vehicle; determine whether the object is in a planned path of the autonomous vehicle; in response to determining that the object is in the planned path, alter the planned path to avoid the object; and in response to determining that the object is in a vicinity of the autonomous vehicle but not in the planned path, continue executing the planned path.

In some aspects, the first sensor is a 3D long-range sensor and the second sensor is a plurality of obstacle depth sensors.

In some aspects, the global path plan is a global map of an airport including at least one selected form the group consisting of a drivable path, a location of a landmark, a traffic pattern, a traffic sign, a speed limit.

In some aspects, the electronic processor is configured to determine a location of the autonomous vehicle using at least one selected from the group consisting of GPS and an indoor positioning system (IPS), and use the location to localize the autonomous vehicle in the global path plan.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
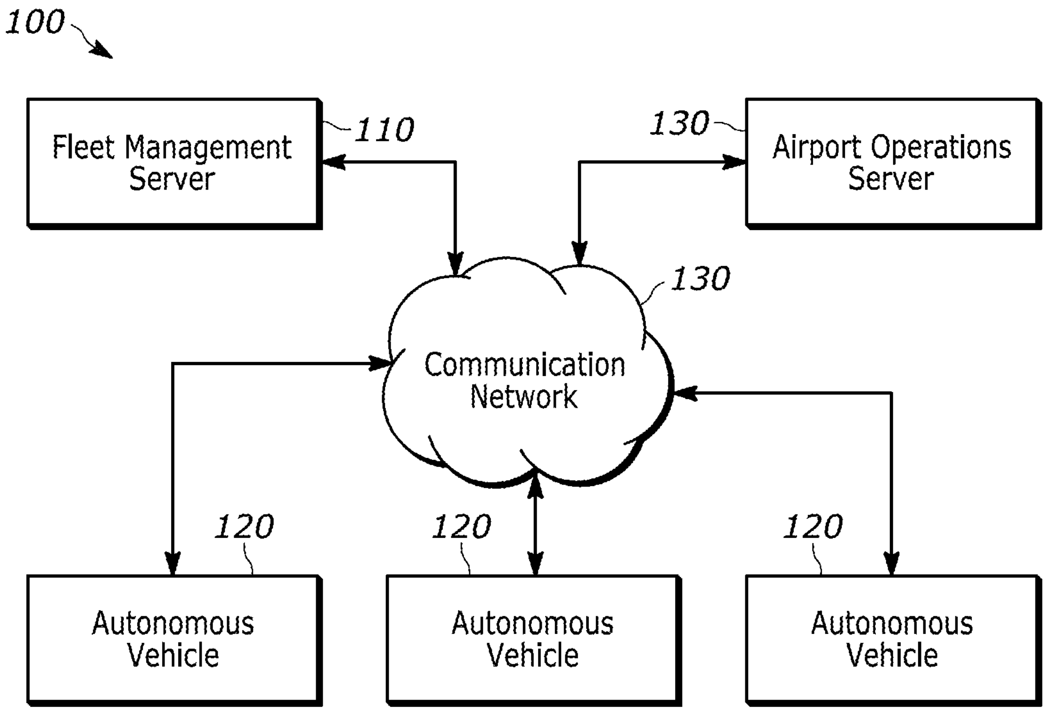
FIG. 1 is a block diagram of an airport fleet management system in accordance with some embodiments.

FIG. 1 illustrates an example embodiment of a fleet management system 100 operating at an airport. The fleet management system 100 includes a fleet management server 110 managing a fleet of autonomous vehicles 120 based on information received from an airport operations server 130. The fleet management server 110 communicates with the autonomous vehicles 120 and the airport operations server 130 over a communication network 140. The airport operations server 130 is, for example, an operations server maintained by the airport at which the fleet of autonomous vehicles 120 are deployed. The communication network 140 is a wired and/or wireless communication network, for example, the Internet, a cellular network, a local area network, and the like.

Figure 2:
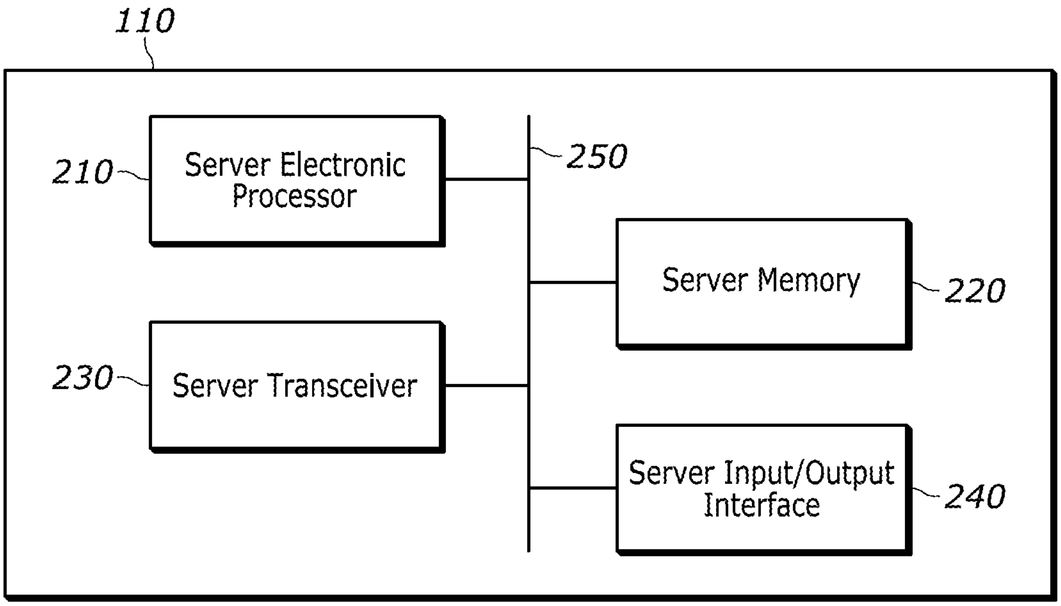
FIG. 2 is a block diagram of a fleet management server of the fleet management system of FIG. 1 in accordance with some embodiments.
Figure 3:
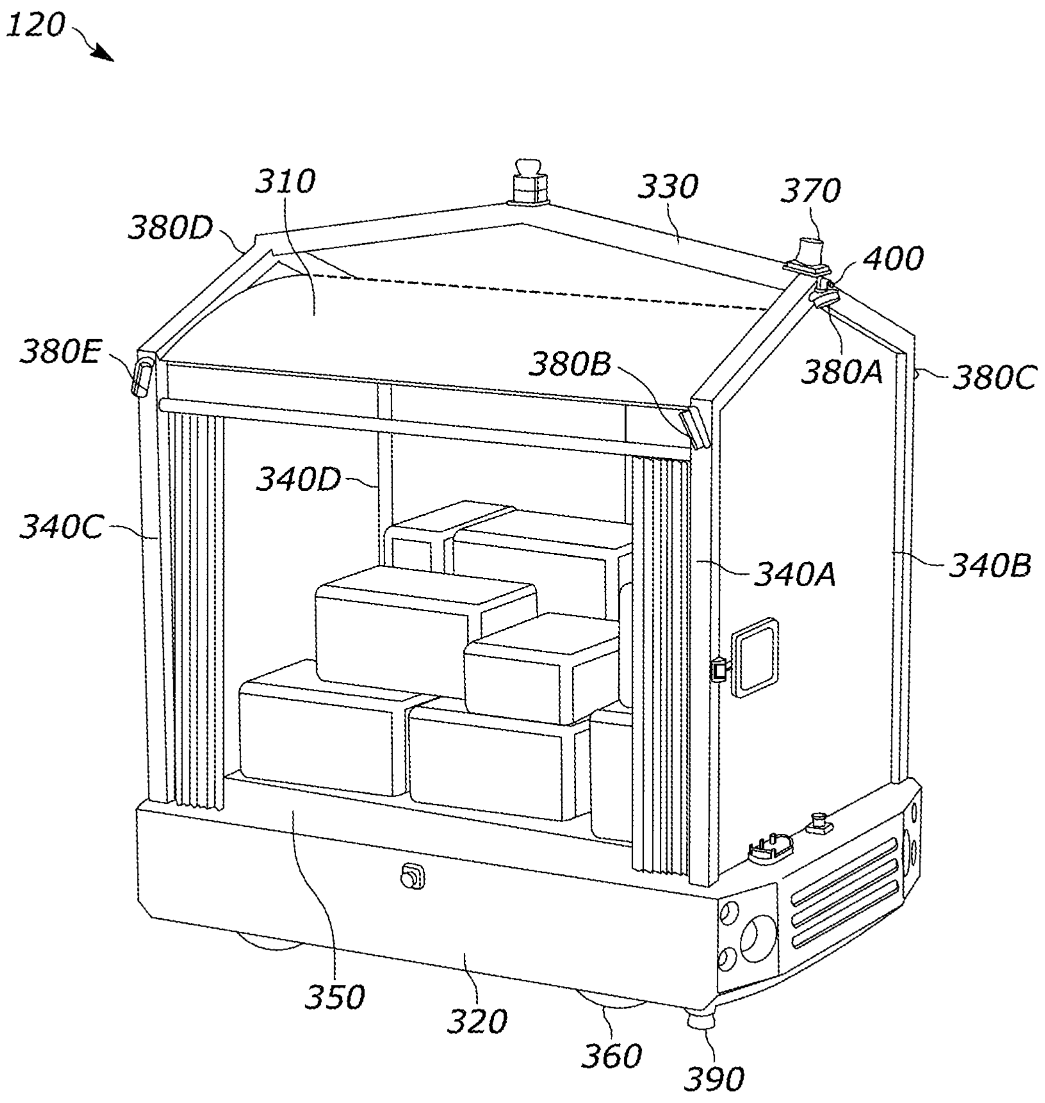
FIG. 3 is a perspective view of an autonomous vehicle of the airport fleet management system of FIG. 1 in accordance with some embodiments.
Figure 4:
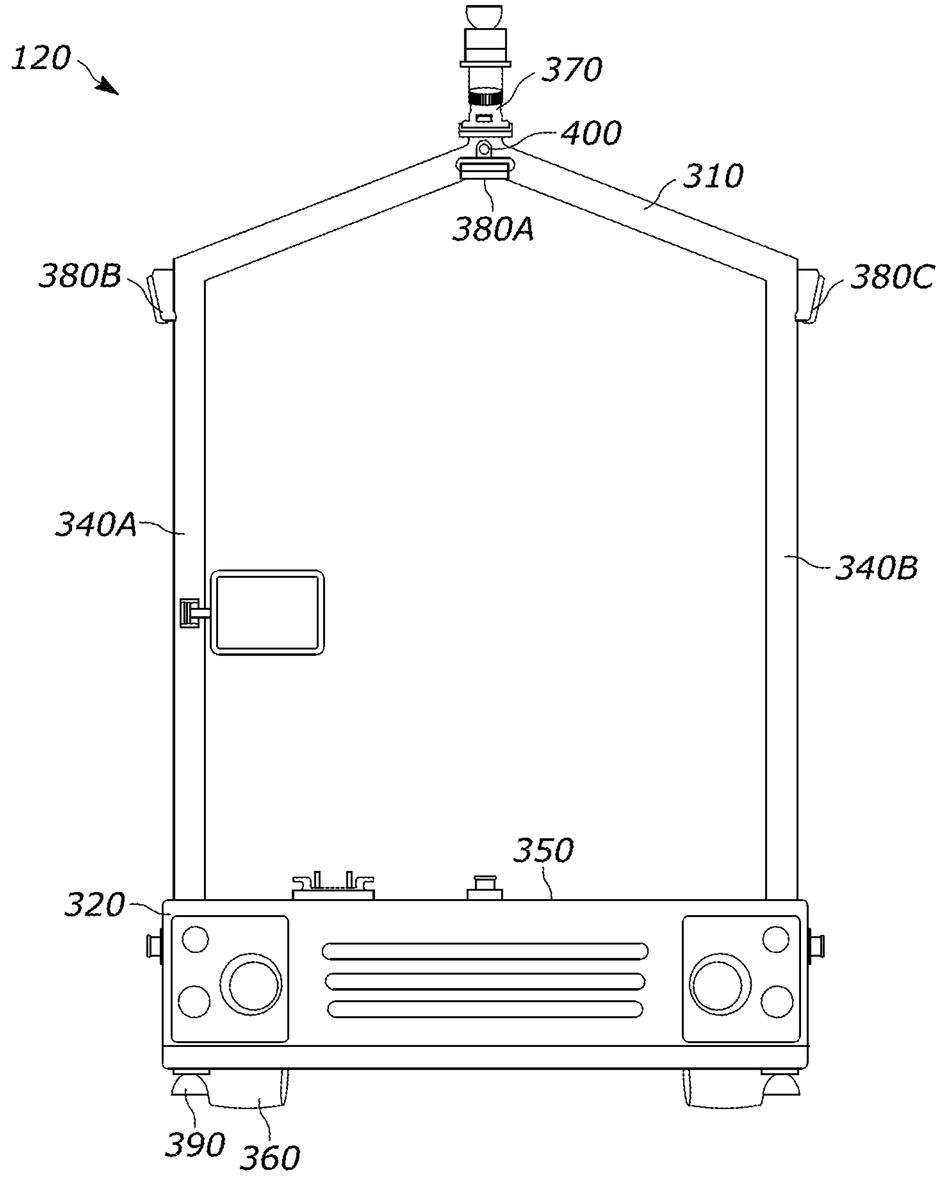
FIG. 4 is a front plan view of the autonomous vehicle of FIG. 3 in accordance with some embodiments.
Figure 5:
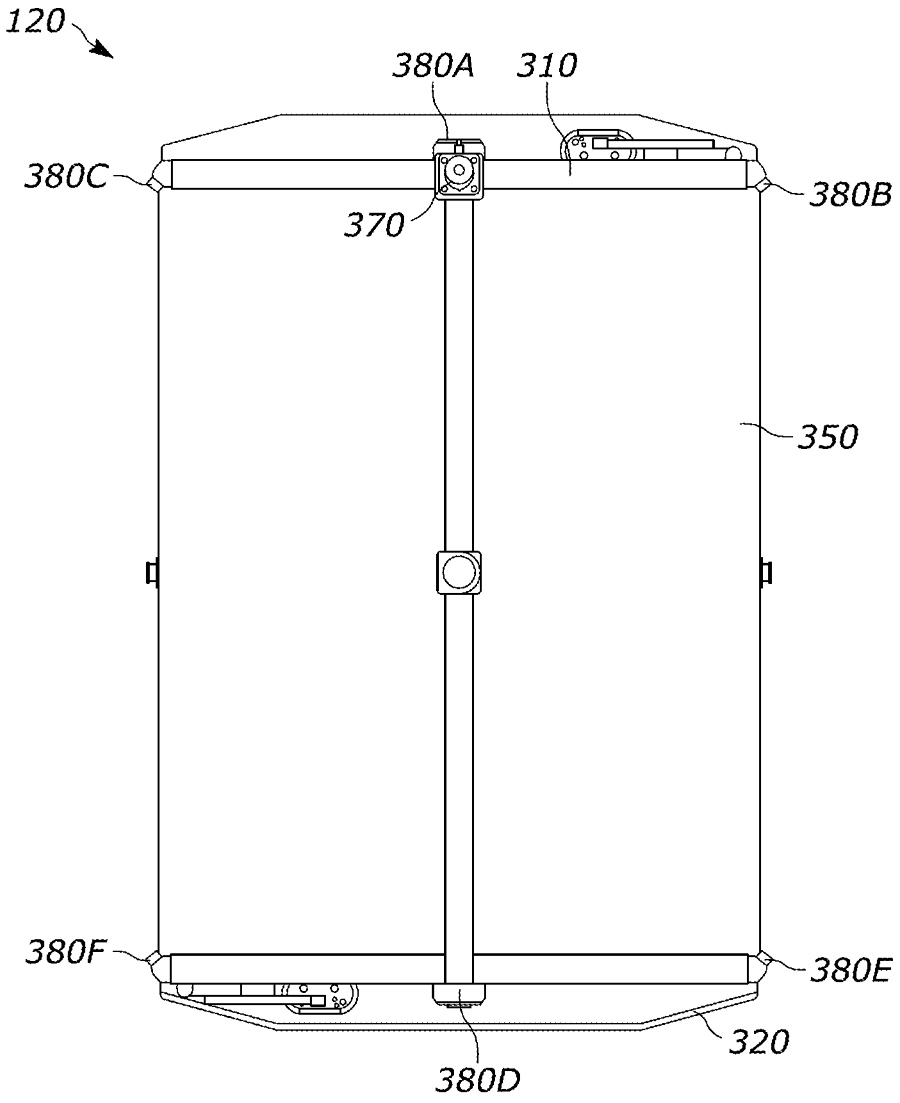
FIG. 5 is a top plan view of the autonomous vehicle of FIG. 3 in accordance with some embodiments.
Figure 6:
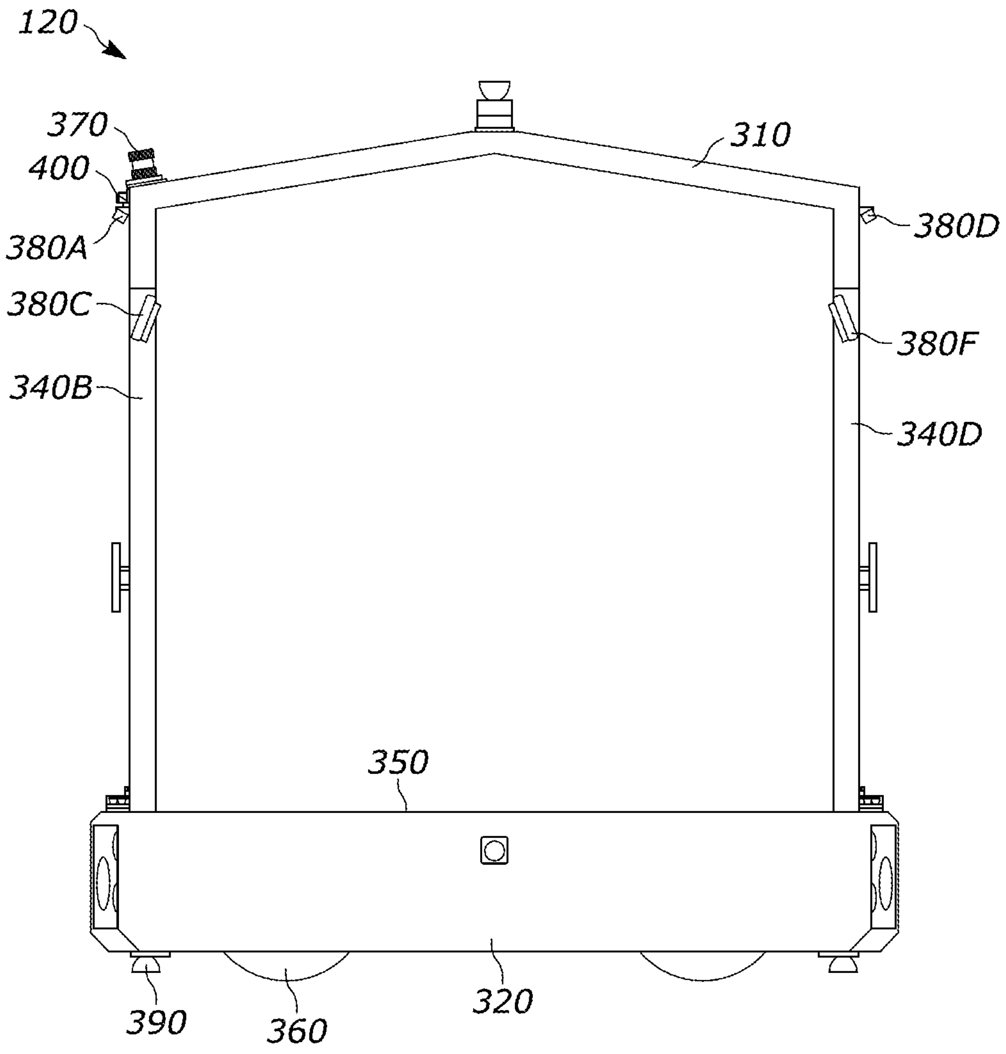
FIG. 6 is a side plan view of the autonomous vehicle of FIG. 3 in accordance with some embodiments.
Figure 7:
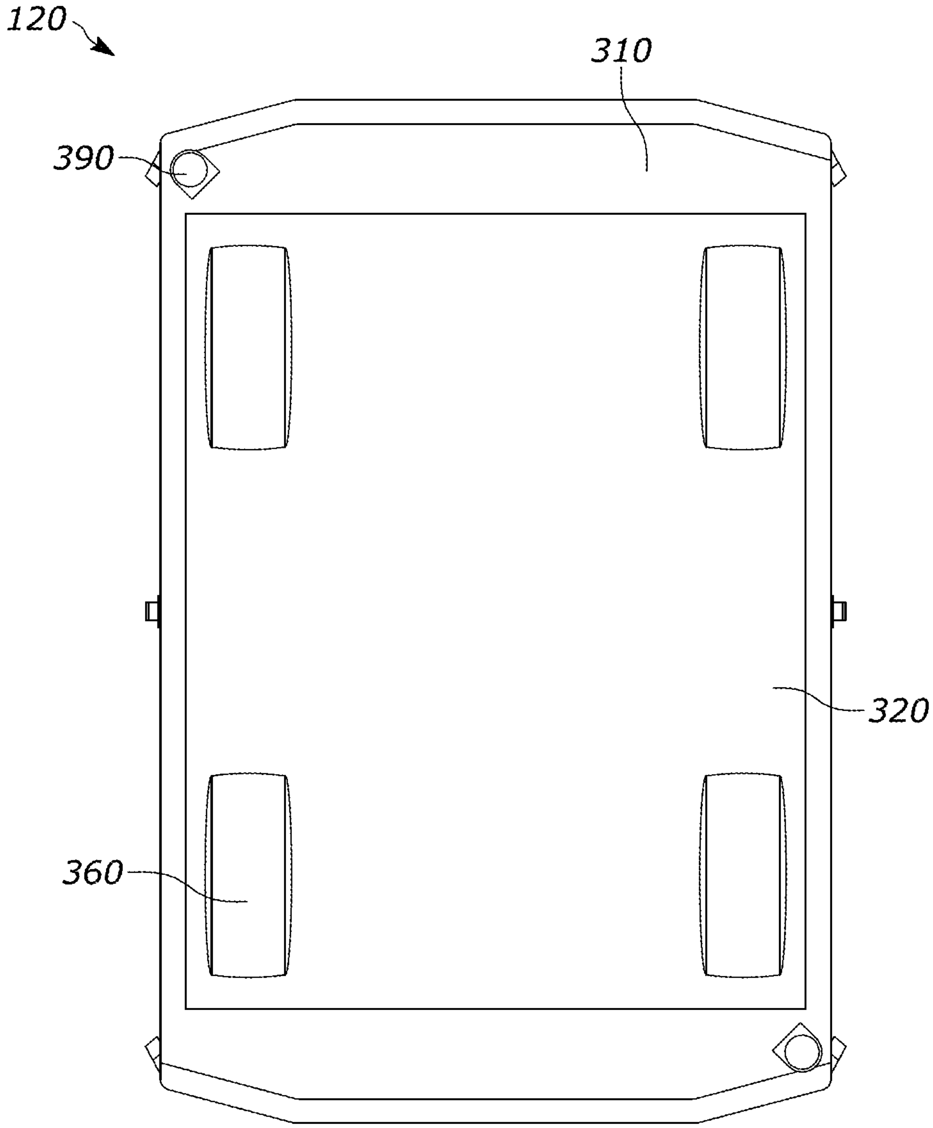
FIG. 7 is a bottom plan view of the autonomous vehicle of FIG. 3 in accordance with some embodiments.

FIG. 2 is a simplified block diagram of an example embodiment of the fleet management server 110. In the example illustrated, the fleet management server 110 includes a server electronic processor 210, a server memory 220, a server transceiver 230, and a server input/output interface 240. The server electronic processor 210, the server memory 220, the server transceiver 230, and the server input/output interface 240 communicate over one or more control and/or data buses (for example, a communication bus 250). The fleet management server 110 may include more or fewer components than those shown in FIG. 2 and may perform additional functions other than those described herein.

In some embodiments, the server electronic processor 210 is implemented as a microprocessor with separate memory, such as the server memory 220. In other embodiments, the server electronic processor 210 may be implemented as a microcontroller (with server memory 220 on the same chip). In other embodiments, the server electronic processor 210 may be implemented using multiple processors. In addition, the server electronic processor 210 may be implemented partially or entirely as, for example, a field programmable gate array (FPGA), an applications-specific integrated circuit (ASIC), and the like and the server memory 220 may not be needed or may be modified accordingly. In the example illustrated, the server memory 220 includes non-transitory, computer-readable memory that stores instructions that are received and executed by the server electronic processor 210 to carry out the functionality of the fleet management server 110 described herein. The server memory 220 may include, for example, a program storage area and a data storage area. The program storage area and the data storage area may include combinations of different types of memory, such as read-only memory, and random-access memory. In some embodiments, the fleet management server 110 may include one server electronic processor 210, and/or plurality of server electronic processors 210, for example, in a cluster arrangement, one or more of which may be executing none, all, or a portion of the applications of the fleet management server 110 described below, sequentially or in parallel across the one or more server electronic processors 210. The one or more server electronic processors 210 comprising the fleet management server 110 may be geographically co-located or may be geographically separated and interconnected via electrical and/or optical interconnects. One or more proxy servers or load balancing servers may control which one or more server electronic processors 210 perform any part or all of the applications provided below.

The server transceiver 230 enables wired and/or wireless communication between the fleet management server 110 and the autonomous vehicles 120 and the airport operations server 130. In some embodiments, the server transceiver 230 may comprise separate transmitting and receiving components, for example, a transmitter and a receiver. The server input/output interface 240 may include one or more input mechanisms (for example, a touch pad, a keypad, a joystick, and the like), one or more output mechanisms (for example, a display, a speaker, and the like) or a combination of the two (for example, a touch screen display).

With reference to FIGS. 3-7, the autonomous vehicle 120 includes a frame 310 having a vehicle base 320, a vehicle top 330, and a plurality of columns 340 supporting the vehicle top 330 on the vehicle base 320. The vehicle base 320 includes an enclosed or partially enclosed housing that houses a plurality of components of the autonomous vehicle 120. In some embodiments, the vehicle base 320 provides a load-bearing platform 350 to receive various kinds of loads, for example, baggage, equipment, personnel, and the like to be transported within the airport. Wheels 360 are provided underneath the vehicle base 320 and are used to move the autonomous vehicle 120. In some embodiments, the wheels 360 may be partially enclosed by the vehicle base 320. The vehicle top 330 may include a cover that is about the same length and width as the platform 350. In some examples, solar panels may be mounted to the vehicle top 330. In other examples, the vehicle top 330 may include integrated solar panels. The solar panels can be used as a primary or secondary power source for the autonomous vehicle 120.

In the example illustrated, the plurality of columns 340 include four columns 340A-D, with two provided at a front of the vehicle base 320 and the other two provided at a rear of the vehicle base 320. A first column 340A is provided on a first side of the front of the vehicle base 320 and a second column 340B is provided on a second opposite side of the front of the vehicle base 320. A third column 340C is provided on the first side of the rear of the vehicle base 320 and a fourth column 340D is provided on the second side of the rear of the vehicle base 320. In some embodiments, some or all of the gaps between the plurality of columns 340 may be partially or fully covered. For example, the gap between the front two columns 340A, 340B may be covered by a first feature (for example, a windshield and the like) and the gap between the rear two columns 340C, 340D may be covered by a second feature (for example, a windshield, opaque cover, and the like). In other embodiments, rather than columns 340 one or more walls may be used to support the vehicle top 330 on the vehicle base 320. In some examples, the autonomous vehicle 120 may not include a vehicle top 330 or the plurality of columns 340. In these examples, the components and the sensors of the autonomous vehicle 120 are directly mounted in or on the vehicle base 320.

In some embodiments, the vehicle base 320 houses an internal combustion engine and a corresponding fuel tank for operating the autonomous vehicle 120. In other embodiments, the vehicle base 320 houses an electric motor and corresponding battery modules for operating the autonomous vehicle 120. The battery modules may include batteries of any chemistry (for example, Lithium-ion, Nickel-Cadmium, Lead-Acid, and the like). In some examples, the battery modules may be replaced by Hydrogen fuel cells. In other examples, the electric motor may be primarily powered by solar panels mounted on or integrated with the vehicle top 330. The solar panels may also be used as a secondary power source and/or to charge the battery modules. An axle connecting the internal combustion engine or the electric motor to the wheels 360 may also be provided within the vehicle base 320. The vehicle base 320 also houses other components, for example, components required for autonomous operation, communication with other components, and the like of the autonomous vehicle 120.

The autonomous vehicle 120 includes several sensors (for example, an obstacle sensor) placed along the frame 310 to guide the autonomous operation of the autonomous vehicle 120. The sensors (for example, a plurality of sensors) include, for example, a three-dimensional (3D) long-range sensor 370 (for example, a first type of sensor), a plurality of obstacle depth sensors 380 (for example, a second type of sensor), a plurality of obstacle planar sensors 390 (for example, a third type of sensor), and one or more video cameras 400 (for example, a fourth type of sensor). In other examples, the plurality of sensors include more or fewer than the sensors listed above. In some examples, the autonomous vehicle 120 includes one obstacle depth sensor 380 and one obstacle planar sensor 390, a plurality of obstacle depth sensors 380 and a plurality of obstacle planar sensors 390, or other combinations of sensors. The 3D long-range sensor 370 is positioned at a front top portion of the frame 310. The 3D long-range sensor 370 may be positioned at or about the mid-point between the front two columns 340A, 340B. The 3D long-range sensor 370 may be positioned at or about the top-most portion (that is, at or about the maximum height) of the frame 310. In one example, the 3D long-range sensor 370 is a three-dimensional LiDAR sensor that uses light signals to detect obstacles in the area surrounding the autonomous vehicles 120. The 3D long-range sensor 370 is used to map a surrounding area of the autonomous vehicle 120. The 3D long-range sensor 370 is three-dimensional and detects obstacles along the front and back of the 3D long-range sensor 370 above and below the plane of the 3D long-range sensor 370. Specifically, the 3D long-range sensor 370 is a multi-planar scanner that detects and measures objects in multiple dimensions to output a three-dimensional map.

The obstacle depth sensors 380 may include, for example, radio detection and ranging (RADAR) sensors, three-dimensional (3D) image sensors, LiDAR sensors, and the like. The obstacle depth sensors 380 detect obstacle depth, that is, distance between an object or obstacle and the obstacle depth sensor 380. In the example illustrated in FIGS. 3-7, the obstacle depth sensors 380 include 3D image sensors, for example, depth sensing image and/or video cameras that capture images and/or videos including metadata that identifies the distance between the 3D image sensor and the objects detected within the images and/or videos. The 3D image sensors are, for example, RGB-D cameras that provide color information (Red-Blue-Green) and depth information within a captured image. The 3D image sensors may use time-of-flight (TOF) sensing technology to detect the distance or depth between the 3D image sensors and the object. In some embodiments, the 3D image sensors include three cameras with two cameras used for depth sensing and one camera used for color sensing. The cameras may include short-range camera, long-range cameras, or a combination thereof. For example, the long-range cameras may be operable to detect a distance up to at least 100 meters. RADAR and LiDAR sensors may also be similarly used to detect obstacles and the distance between the obstacle depth sensor 380 and the obstacle. The plurality of obstacle depth sensors 380 are placed around frame 310 of the autonomous vehicle 120 to provide 360 degree full view coverage around the autonomous vehicle 120. The 360 degree full view coverage enables the autonomous vehicle 120 to detect both objects on the ground in the vicinity of the autonomous vehicle 120, as well as overhanging objects (e.g., an airplane engine, wing, gate bridge, or the like).

Figure 8:
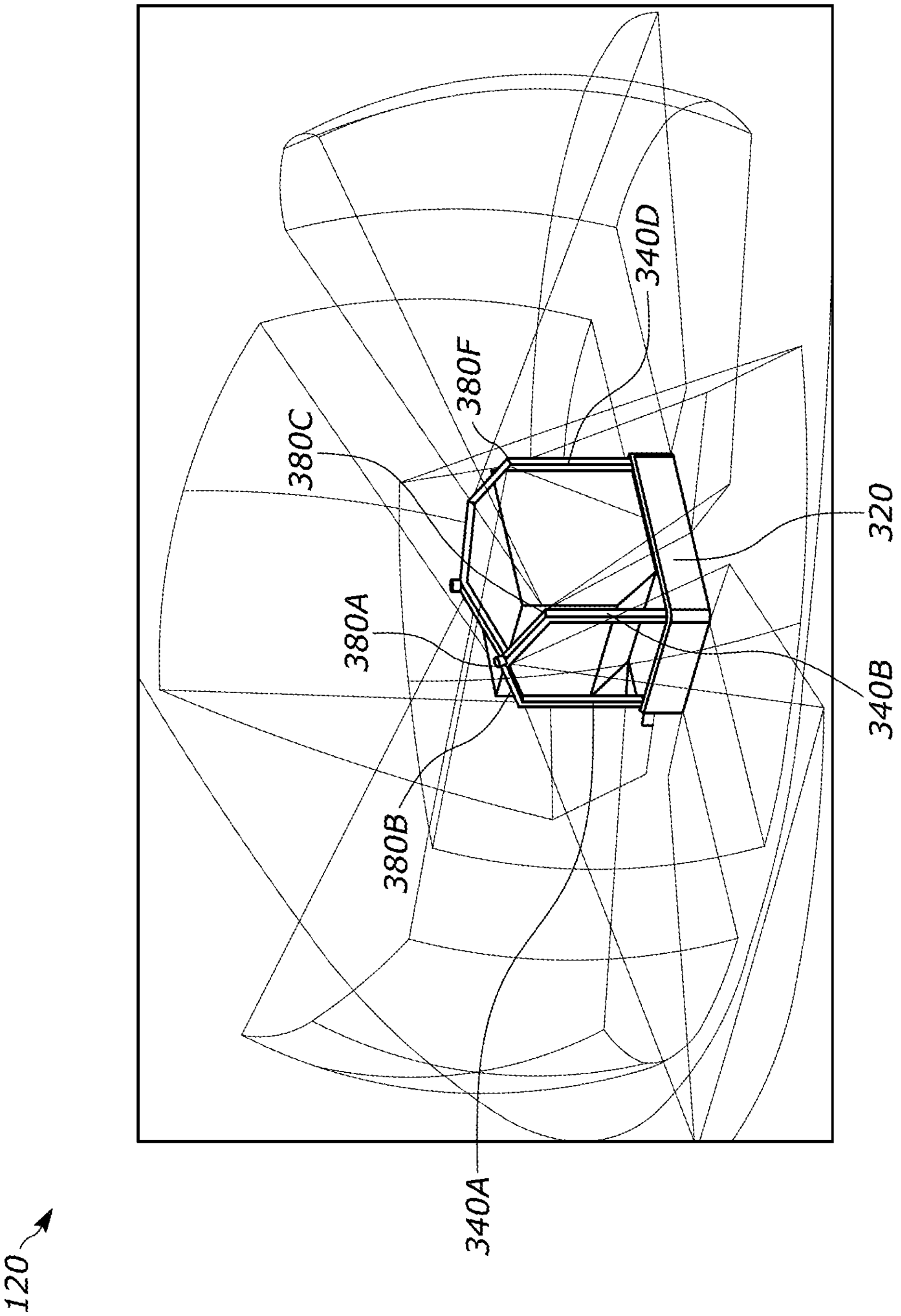
FIG. 8 is a perspective view of a sensor coverage area of the autonomous vehicle of FIG. 3 in accordance with some embodiments.
Figure 9:
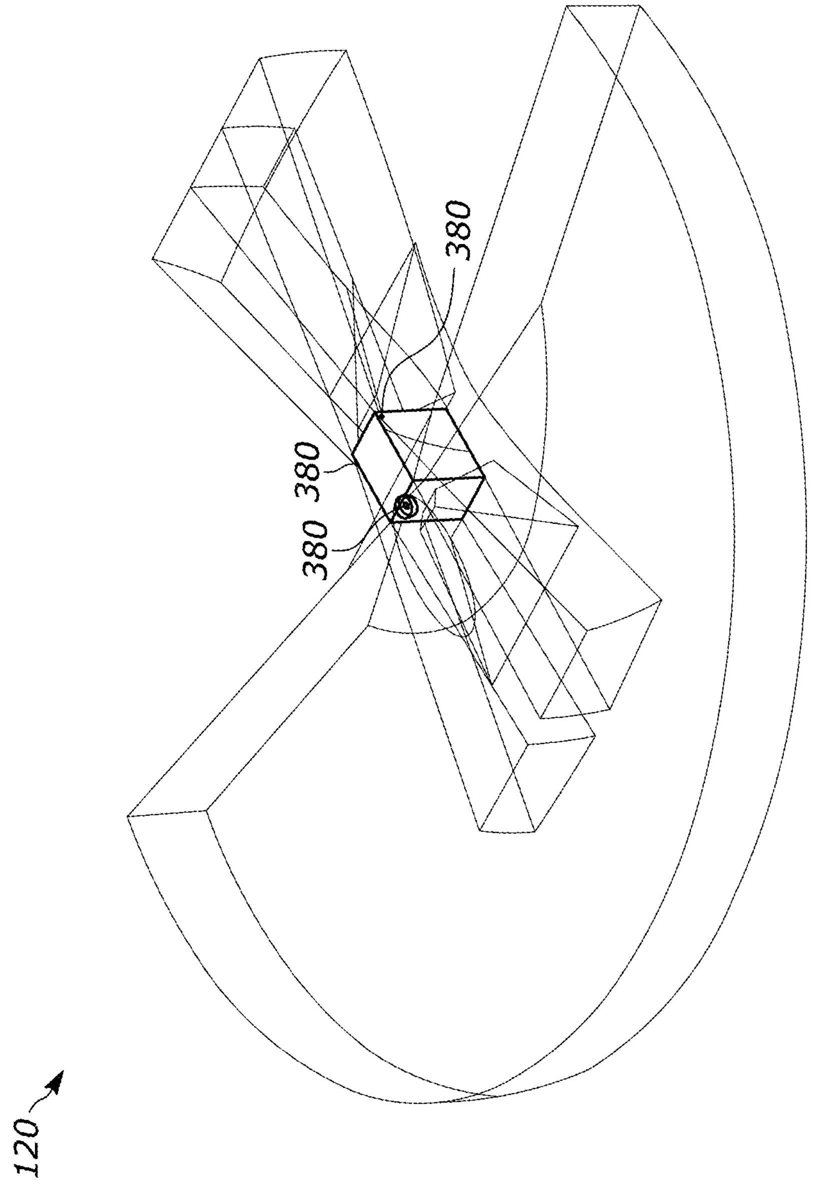
FIG. 9 is another perspective view of a sensor coverage area of the autonomous vehicle of FIG. 3 in accordance with some embodiments.

FIG. 8 illustrates one example illustration of the 360 degree full view coverage offered by the placement of the plurality of obstacle depth sensors 380. When 3D image sensors are used as the obstacle depth sensors 380, the obstacle depth sensors 380 (that is, the 3D depth sensors) capture images 360 degrees about the frame 310 of the autonomous vehicle 120. FIG. 9 illustrates another example illustration of the 3D sensing coverage offered by the 3D image sensors included in the plurality of obstacle depth sensors 380.

Returning to FIGS. 3-7, a first obstacle depth sensor 380A is placed at the front top portion of the frame 310 underneath the 3D long-range sensor 370. The first obstacle depth sensor 380A may be positioned at or about the mid-point between the front two columns 340A, 340B. The first obstacle depth sensor 380A is forward facing and detects obstacle depth and/or captures images and/or videos within a field of view (for example, 90 degree field of view) of the first obstacle depth sensor 380A. The first obstacle depth sensor 380A may be angled downward such that a plane of the center of the field of view of the first obstacle depth sensor 380A is provided at an angle between 0 degrees and 60 degrees (for example, about 30 degrees) below the horizontal plane of the autonomous vehicle 120 (see FIG. 4 for example). A second obstacle depth sensor 380B may be mounted to the first column 340A or to a mounting feature provided on the first column 340A. The second obstacle depth sensor 380B is rearward facing and detects obstacle depth and/or captures images and/or videos within a field of view (for example, 90 degree field of view) of the second obstacle depth sensor 380B. The second obstacle depth sensor 380B may be angled away from the autonomous vehicle 120 such that the plane of the center of field of view of the second obstacle depth sensor 380B is provided at an angle between 0 degrees and 60 degrees (for example, about 30 degrees) away from the plane connecting the first column 340A and the third column 340C. The second obstacle depth sensor 380B may be angled downward such that a plane orthogonal to the plane of the center of the field of view of the second obstacle depth sensor 380B is provided at an angle between 0 degrees and 60 degrees (for example, about 30 degrees) below the horizontal plane of the autonomous vehicle 120. A third obstacle depth sensor 380C may be mounted to the second column 340B or to a mounting feature provided on the second column 340B. The third obstacle depth sensor 380C is rearward facing and detects obstacle depth and/or captures images and/or videos within a field of view (for example, 90 degree field of view) of the third obstacle depth sensor 380C. The third obstacle depth sensor 380C may be angled away from the autonomous vehicle 120 such that the plane of the center of field of view of the third obstacle depth sensor 380C is provided at an angle between 0 degrees and 60 degrees (for example, about 30 degrees) away from the plane connecting the second column 340B and the fourth column 340D. The third obstacle depth sensor 380C may be angled downward such that a plane orthogonal to the plane of the center of the field of view of the third obstacle depth sensor 380C is provided at an angle between 0 degrees and 60 degrees (for example, about 30 degrees) below the horizontal plane of the autonomous vehicle 120.

A fourth obstacle depth sensor 380D is placed at the rear top portion of the frame 310. The fourth obstacle depth sensor 380D may be positioned at or about the mid-point between the rear two columns 340C, 340D. The fourth obstacle depth sensor 380D is rearward facing and detects obstacle depth and/or captures images and/or videos within a field of view (for example, 90 degree field of view) of the fourth obstacle depth sensor 380D. The fourth obstacle depth sensor 380D may be angled downward such that a plane of the center of the field of view of the fourth obstacle depth sensor 380D is provided at an angle between 0 degrees and 60 degrees (for example, about 30 degrees) below the horizontal plane of the autonomous vehicle 120. A fifth obstacle depth sensor 380E may be mounted to the third column 340C or to a mounting feature provided on the third column 340C. The fifth obstacle depth sensor 380E is forward facing and detects obstacle depth and/or captures images and/or videos within a field of view (for example, 90 degree field of view) of the fifth obstacle depth sensor 380E. The fifth obstacle depth sensor 380E may be angled away from the autonomous vehicle 120 such that the plane of the center of field of view of the fifth obstacle depth sensor 380E is provided at an angle between 0 degrees and 60 degrees (for example, about 30 degrees) away from the plane connecting the first column 340A and the third column 340C. The fifth obstacle depth sensor 380E may be angled downward such that a plane orthogonal to the plane of the center of the field of view of the fifth obstacle depth sensor 380E is provided at an angle between 0 degrees and 60 degrees (for example, about 30 degrees) below the horizontal plane of the autonomous vehicle 120. A sixth obstacle depth sensor 380F may be mounted to the fourth column 340D or to a mounting feature provided on the fourth column 340D. The sixth obstacle depth sensor 380F is forward facing and detects obstacle depth and/or captures images and/or videos within a field of view (for example, 90 degree field of view) of the sixth obstacle depth sensor 380F. The sixth obstacle depth sensor 380F may be angled away from the autonomous vehicle 120 such that the plane of the center of field of view of the sixth obstacle depth sensor 380F is provided at an angle between 0 degrees and 60 degrees (for example, about 30 degrees) away from the plane connecting the second column 340B and the fourth column 340D. The sixth obstacle depth sensor 380F may be angled downward such that a plane orthogonal to the plane of the center of the field of view of the sixth obstacle depth sensor 380F is provided at an angle between 0 degrees and 60 degrees (for example, about 30 degrees) below the horizontal plane of the autonomous vehicle 120. The above provides only one example of the placement of the plurality of obstacle depth sensors 380 to achieve full 360 degree coverage. Other placements and configurations of the obstacle depth sensors 380 may also be used to achieve full 360 degree coverage. For example, full 360 degree coverage may also be achieved by placing four obstacle depth sensors 380 having a 180 degree field of view on each side of the autonomous vehicle 120.

Figure 10:
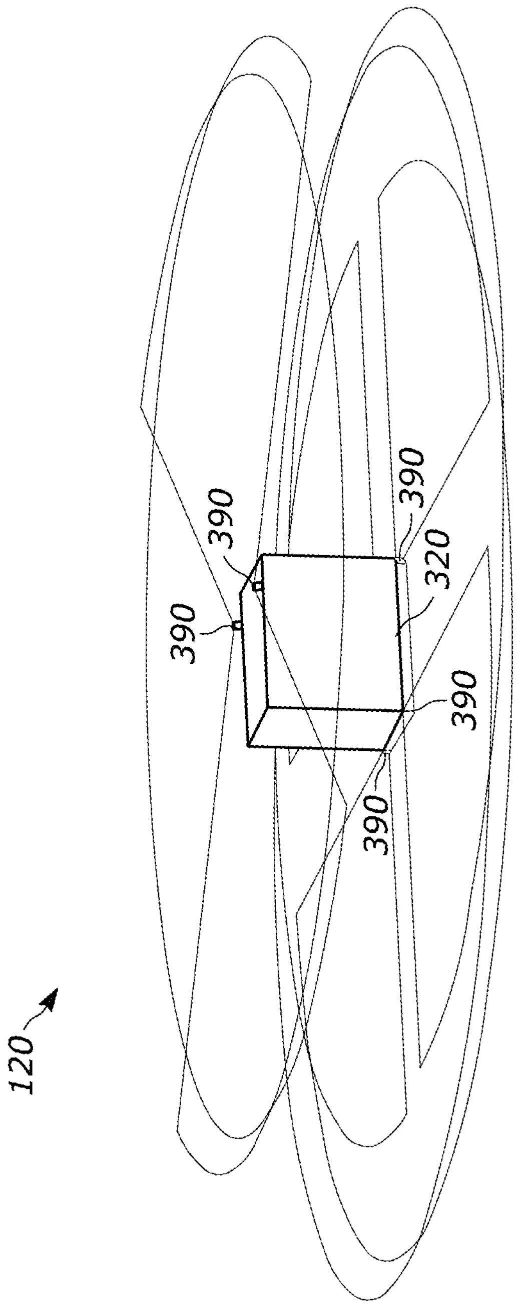
FIG. 10 is a perspective view of a planar sensor coverage area of the autonomous vehicle of FIG. 3 in accordance with some embodiments.

The obstacle planar sensors 390 are, for example, planar LiDAR sensors (that is, two-dimensional (2D) LiDAR sensors). The obstacle planar sensors 390 may be mounted to the vehicle base 320 near the bottom and at or around (for example, toward) the front of the vehicle base 320. As used herein, toward a front of the vehicle includes a location between a mid-point and a front of the vehicle. The obstacle planar sensors 390 may be used as a failsafe to detect any obstacles that may be too close to the autonomous vehicle 120 or that may get under the wheels 360 of the autonomous vehicle 120. Each obstacle planar sensor 390 detects objects along, for example, a single plane at about the height of the obstacle planar sensor 390. For example, FIG. 10 illustrates an example of the coverage provided by the obstacle planar sensors 390. In the example illustrated in FIG. 10, the obstacle planar sensors 390 are mounted at each of four corners of the vehicle base 320 of the autonomous vehicle 120. Each of the obstacle planar sensors 390 placed at the four corners provides 270 degrees of sensor coverage about the frame 310. For example, an obstacle planar sensor 390 provided at a front-left of the frame 310 provides sensor coverage 270 degrees around the front and left sides of the frame 310, an obstacle planar sensor 390 provided at a front-right of the frame 310 provides sensor coverage 270 degrees around the front and right sides of the frame 310, and so on. The four obstacle planar sensors 390 therefore provide overlapping sensor coverage around a bottom plane of the autonomous vehicle 120. In addition, two obstacle planar sensors 390 may be mounted on opposing sides of the top (for example, toward a top) of the autonomous vehicle 120 above a rear (for example, above a rear axle or about $3/4^{th}$ of the way from the front to the back) of the autonomous vehicle 120. As used herein, toward a top of the vehicle includes a location between a mid-point and a full height of the vehicle. Each of the obstacle planar sensors 390 placed at the top provides 270 degrees of sensor coverage about the frame 310. For example, an obstacle planar sensor 390 provided at a top-left of the frame 310 provides sensor coverage 270 degrees around the left, front, and rear sides of the frame 310, an obstacle planar sensor 390 provided at a top-right of the frame 310 provides sensor coverage 270 degrees around the right, front, and rear sides of the frame 310. The two obstacle planar sensors 390 therefore provide overlapping sensor coverage around a top plane of the autonomous vehicle 120. The obstacle planar sensors 390 provide multiple planes of sensing for the autonomous vehicle 120. The obstacle planar sensors 390 sense horizontal slices of sensor data corresponding to the environment surrounding the autonomous vehicle 120. In one example, only a single obstacle planar sensor 390 is used. For example, the single obstacle planar sensor 390 shown in FIG. 4 may be placed at a bottom portion in front of a wheel 360 of the autonomous vehicle 120.

The video cameras 400 may be, for example, visible light video cameras, infrared (or thermal) video cameras, night-vision video cameras and the like. The video cameras 400 may be mounted at the front top portion of the frame 310 between the 3D long-range sensor 370 and the first obstacle depth sensor 380A. The video cameras 400 may be used to detect the path of the autonomous vehicle 120 and may be used to detect objects beyond the field of view of the obstacle depth sensors 380 along the front of the autonomous vehicle 120.

Figure 11:
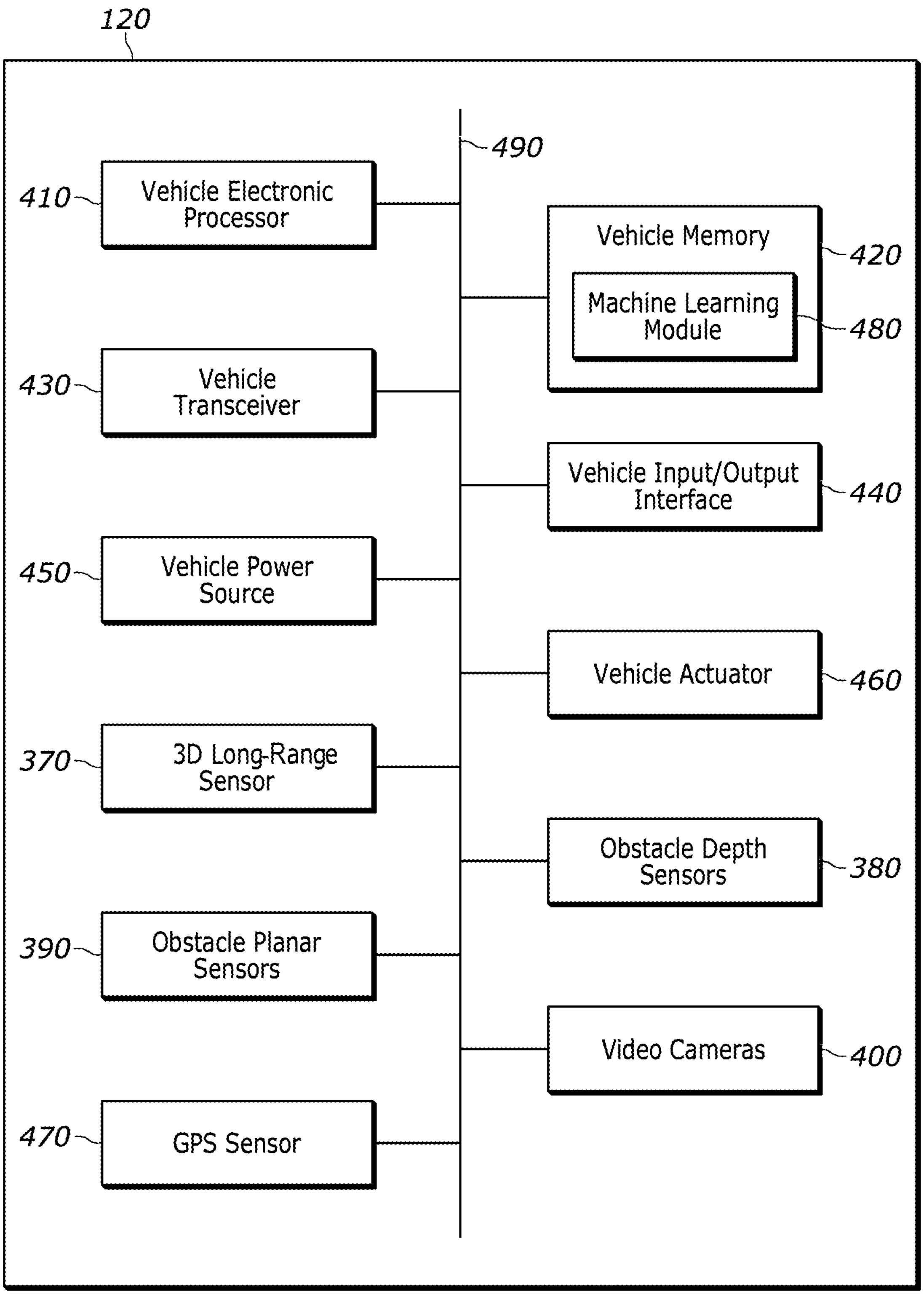
FIG. 11 is a block diagram of the autonomous vehicle of FIG. 3 in accordance with some embodiments.

FIG. 11 is a simplified block diagram of the autonomous vehicle 120. In the example illustrated, the autonomous vehicle 120 includes a vehicle electronic processor 410, a vehicle memory 420, a vehicle transceiver 430, a vehicle input/output interface 440, a vehicle power source 450, a vehicle actuator 460, a global positioning system (GPS) sensor 470, the 3D long-range sensor 370, the plurality of obstacle depth sensors 380, the obstacle planar sensors 390, and the video cameras 400. The vehicle electronic processor 410, the vehicle memory 420, the vehicle transceiver 430, the vehicle input/output interface 440, the vehicle power source 450, the vehicle actuator 460, the GPS sensor 470, the 3D long-range sensor 370, the plurality of obstacle depth sensors 380, the obstacle planar sensors 390, and the video cameras 400 communicate over one or more control and/or data buses (for example, a vehicle communication bus 490). The vehicle electronic processor 410, the vehicle memory 420, the vehicle transceiver 430, and the vehicle input/output interface 440 may be implemented similar to the server electronic processor 210, server memory 220, server transceiver 230, and the server input/output interface 240. The vehicle memory 420 may store a machine learning module 480 (e.g., including a deep learning neural network) that is used for autonomous operation of the autonomous vehicle 120.

The autonomous vehicle 120 may be an electric vehicle, an internal combustion engine vehicle, and the like. When the autonomous vehicle 120 is an internal combustion engine vehicle, the vehicle power source 450 includes, for example, a fuel tank, a fuel injector, and/or the like and the vehicle actuator 460 includes the internal combustion engine. When the autonomous vehicle 120 is an electric vehicle, the vehicle power source 450 includes, for example, a battery module and the vehicle actuator 460 includes an electric motor. In the event of a failure of the vehicle power source 450, the vehicle electronic processor 410 is configured to brake the autonomous vehicle 120 such that the autonomous vehicle 120 remains in a stationary position. The GPS sensor 470 receive GPS time signals from GPS satellites. The GPS sensor 470 determines the location of the autonomous vehicle 120 and the GPS time based on the GPS time signals received from the GPS satellites. In indoor settings, the autonomous vehicle 120 may rely on an indoor positioning system (IPS) for localization within the airport. In some instances, the autonomous vehicle 120 relies on a combination of GPS localization and IPS localization.

The autonomous vehicle 120 communicates with the fleet management server 110 and/or the airport operations server 130 to perform various tasks. The tasks include, for example, transporting baggage between a terminal and an aircraft, transporting baggage between aircrafts, transporting equipment between service stations and aircrafts, transporting personnel between terminals, transporting personnel between terminals and aircrafts, and/or the like. The fleet management server 110 manages the one or more autonomous vehicles 120 and assigns specific tasks to the one or more autonomous vehicles 120.

Figure 12:
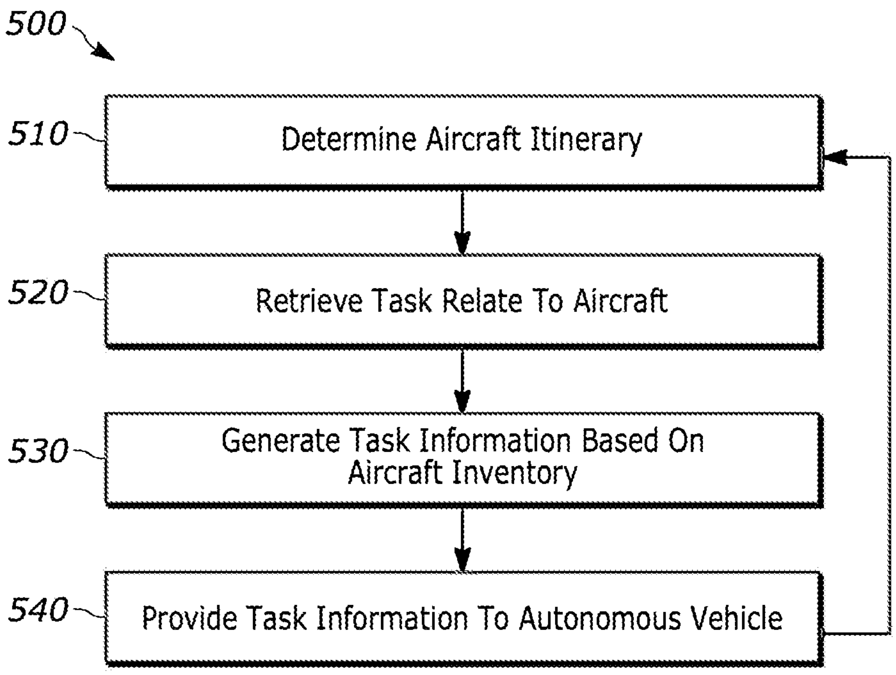
FIG. 12 is a flowchart of a method for fleet management at an airport by the fleet management system of FIG. 1 in accordance with some embodiments.

FIG. 12 illustrates a flowchart of an example method 500 for fleet management at an airport. The method 500 may be performed by the fleet management server 110. In the example illustrated, the method 500 includes determining, using the server electronic processor 210, aircraft itinerary (at block 510). Aircraft itinerary may include information relating to the aircraft, for example, arrival time, departure time, origin, destination, flight number, expected gate location, actual gate location, surface position, aircraft coordinate position, and the like. The fleet management server 110 may receive the aircraft itinerary from the airport operations server 130. In some embodiments, the fleet management server 110 may maintain a database of aircraft itinerary, which may be updated by the airline managing the aircrafts.

The method 500 also includes retrieving, using the server electronic processor 210, a task related to the aircraft (at block 520). The tasks related to the aircraft may be common tasks that are usually performed with every aircraft, for example, load and/or unload baggage, load and/or unload supplies, fuel, and the like. The tasks related to the aircraft may be stored in the database of aircraft itinerary, for example, in the server memory 220. The task related to the aircraft may be retrieved in response to determining the aircraft itinerary. In some embodiments, the task related to the aircraft may be retrieved at particular times of the day or at a time interval prior to the time information (e.g., departure/arrival time) provided with the aircraft itinerary.

The method 500 includes generating, using the server electronic processor 210, task information based on aircraft itinerary (at block 530). The task information may include locations, start time, end time, and the like relating to the task. The task information is generated based on the aircraft itinerary. For example, the start time and/or end time may be determined based on the aircraft departure time. In one example, the task information may include a command to load an aircraft with baggage 40 minutes prior to the departure of the aircraft. The task information may also include location information based on, for example, the gate location of the aircraft, the location to receive baggage for the aircraft, and the like.

The method 500 further includes providing, using the server electronic processor 210, the task information to an autonomous vehicle 120 (at block 540). The fleet management server 110 may transmit the task information to the autonomous vehicle 120 over the communication network 140 using the server transceiver 230. In some embodiments, the fleet management server 110 may select an appropriate autonomous vehicle 120 for the task. The fleet of autonomous vehicles 120 may be divided by types. For example, a first type of autonomous vehicle 120 transports baggage, a second type of autonomous vehicle 120 transports personnel, and the like. The fleet management server 110 may select the type of autonomous vehicle 120 appropriate for performing the task related to the aircraft and provide the task information to the selected autonomous vehicle 120. In some embodiments, the server electronic processor 210 determines whether to transmit the task information to an autonomous vehicle or a human operator based on various factors.

Figure 13:
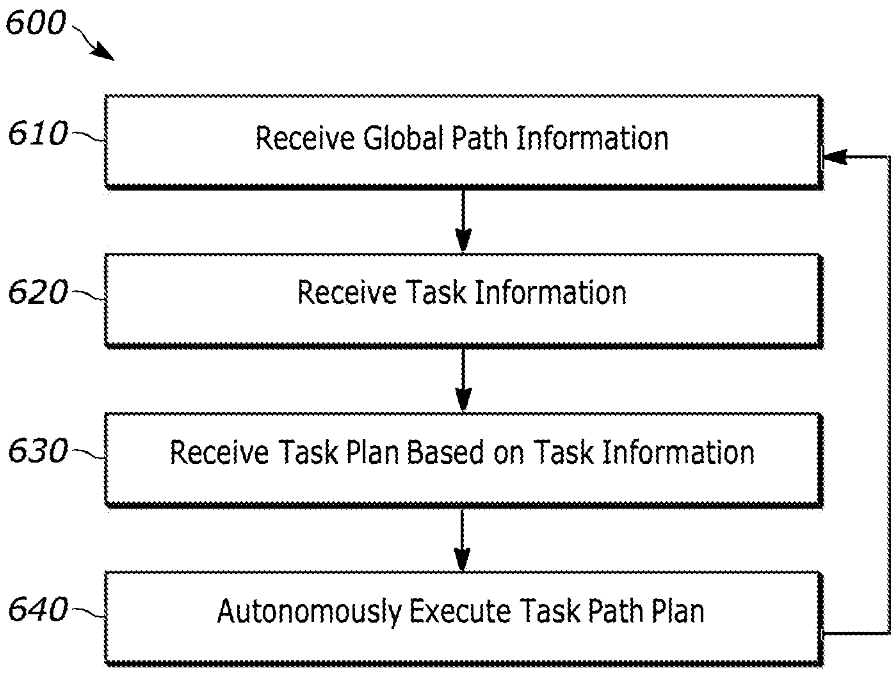
FIG. 13 is a flowchart of a method for task execution by the autonomous vehicle of FIG. 3 in accordance with some embodiments.

FIG. 13 illustrates a flowchart of an example method 600 for task execution by an autonomous vehicle 120. The method 600 may be performed by the autonomous vehicle 120. In the example illustrated, the method 600 includes receiving, using the vehicle electronic processor 410, global path information, including, for example, a global path plan (at block 610). The global path plan is, for example, a map of the airport including the location of drivable paths, location of landmarks (e.g., gates, terminals, and the like), traffic patterns, traffic signs, speed limits, and the like. In some embodiments, the global path plan is received by the autonomous vehicle 120 during initial setup with ongoing updates to the global path plan received as needed. The global path plan may be received from the fleet management server 110 or the airport operations server 130.

The method 600 includes receiving, using the vehicle electronic processor 410, task information (at block 620). As discussed above, the fleet management server 110 generates task information based on aircraft itinerary and tasks related to aircraft itinerary. The fleet management server 110 then provides the task information to the autonomous vehicle 120. The task information may include locations, start time, end time, and the like relating to the task.

The method 600 also includes determining, using the vehicle electronic processor 410, a task path plan based on the task information (at block 630). The task path plan may include a driving path between the location of the autonomous vehicle 120 and the various locations related to the task. For example, the various locations may include a baggage pick up or drop off location, a gate location, a charging location, a cargo container pickup location, a maintenance point, and the like. The driving path may be the shortest path between each of the location. In some embodiments, the driving path may avoid certain gates or locations based on arrival and departure times of other aircrafts.

The method 600 further includes autonomously executing, using the vehicle electronic processor 410, the task path plan (at block 640). The vehicle electronic processor 410 uses the information from the sensors (that is, the 3D long-range sensor 370, the obstacle depth sensors 380, the obstacle planar sensors 390, and the video cameras 400) to navigate the autonomous vehicle 120 over the determined task path. Executing the task path may also include stopping and waiting at a location until a further input is received or the autonomous vehicle 120 is filled to a specified load. The vehicle electronic processor 410 controls the vehicle actuator 460 based on the information received from the sensors to navigate the autonomous vehicle 120.

Figure 14:
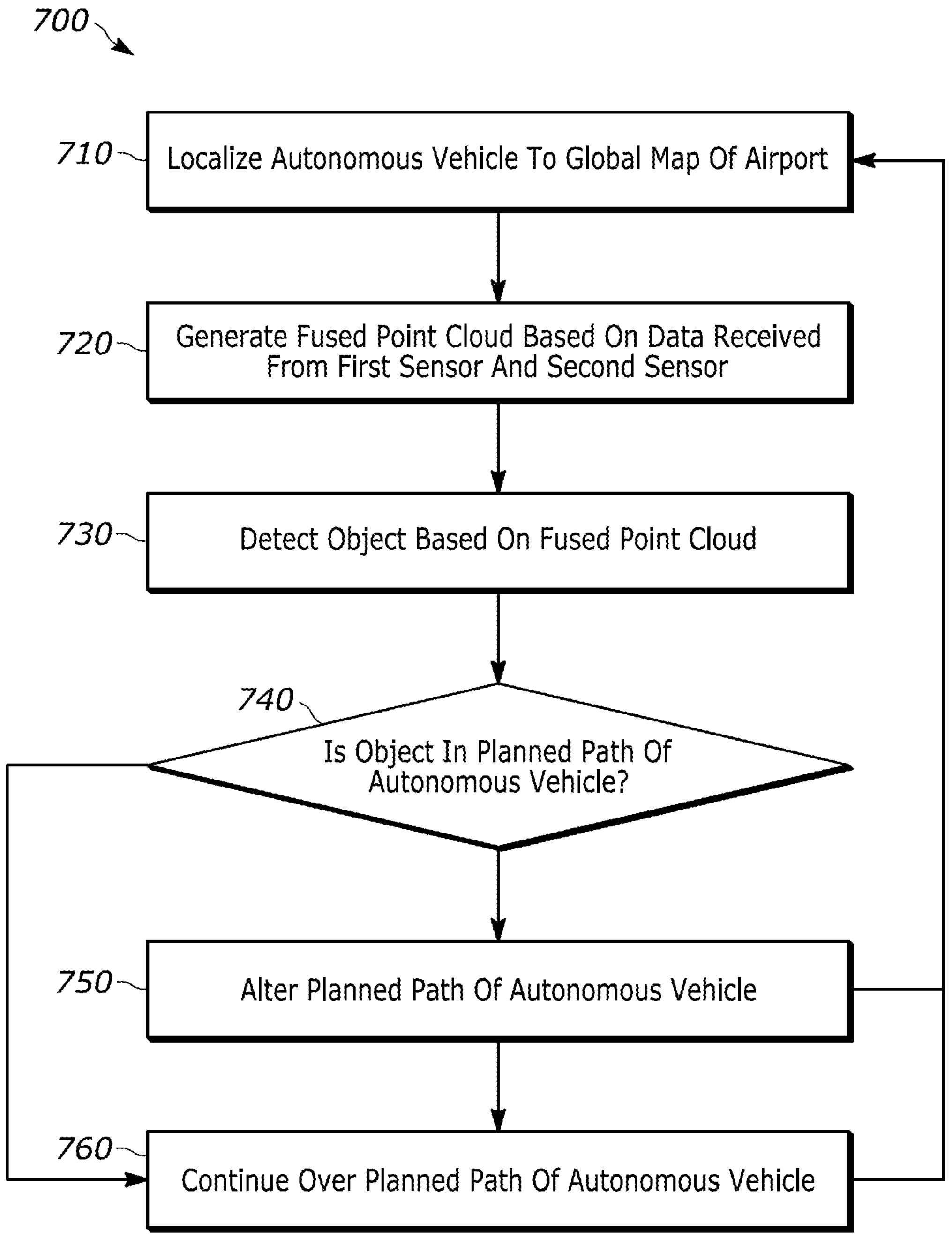
FIG. 14 is a flowchart of a method for autonomously executing a task path plan of the autonomous vehicle of FIG. 3 in accordance with some embodiments.

FIG. 14 illustrates a flowchart of an example method 700 for autonomously executing a task path plan. The method 700 may be performed by the autonomous vehicle 120. In the example illustrated, the method 700 includes localizing, using the vehicle electronic processor 410, the autonomous vehicle 120 to a global map of the airport (at block 710). The global map is, for example, a global path plan as discussed above and includes the location of drivable paths, location of landmarks (e.g., gates, terminals, and the like), traffic patterns, traffic signs, speed limits, and the like of the airport or usable portions of the airport. The vehicle electronic processor 410 determines the location of the autonomous vehicle 120 using the GPS and/or IPS, and uses the location to localize to the map. Localizing to the map includes determining the position or location of the autonomous vehicle 120 in the global map of the airport. In some embodiments, the autonomous vehicle 120 may be operated without localization based on detection of obstacles in relation to the location of the autonomous vehicle 120.

The method 700 also includes generating, using the vehicle electronic processor 410, a fused point cloud based on data received from a first sensor and a second sensor (at block 720). The first sensor is of a first sensor type and the second sensor is of a second sensor type that is different from the first sensor type. For example, the first sensor is a 3D long-range sensor 370 (for example, a 3D LiDAR sensor) and the second sensor is one or more of the plurality of obstacle depth sensors 380 (for example, 3D image sensors). In some embodiments, the second sensor is the video camera 300. The 3D long-range sensor 370 generates a three-dimensional point cloud of the surroundings of the autonomous vehicle 120. This three-dimensional point cloud is then fused with images captured by the 3D image sensors to generate a fused point cloud. When two two-dimensional point clouds or images are fused, each pixel from the first two-dimensional point cloud is matched to a corresponding pixel of the second two-dimensional point cloud. In three-dimensional point clouds, a voxel takes the place of a pixel. When fusing a 3D (for example, RGB-D) image from a 3D image sensor with the 3D point cloud of the 3D LiDAR sensor, a voxel of the 3D image may be matched with the corresponding voxel of the 3D point cloud. The fused point cloud includes the matched voxels from the 3D image and the 3D point cloud.

The method 700 includes detecting, using the vehicle electronic processor 410, an object based on the fused point cloud (at block 730). The vehicle electronic processor 410 uses the fused point cloud to detect objects. The fused point cloud is also used to detect the shape and location of the objects relative to the autonomous vehicle 120. In some embodiments, the vehicle electronic processor 410 processes obstacle information associated with the object relative to a current position of the autonomous vehicle 120. In some embodiments, the locations of the objects with respect to the global map may also be determined using the fused point cloud. In some embodiments, the vehicle electronic processor 410 may classify the detected object. For example, using the machine learning module 480, the vehicle electronic processor 410 may determine whether the object is a fixed object (for example, a traffic cone, a pole, and the like) or a moveable object (for example, a vehicle, a person, an animal, and the like).

The method 700 further includes determining, using the vehicle electronic processor 410, whether the object is in a planned path of the autonomous vehicle 120 (at block 740). The vehicle electronic processor 410 compares the location of the planned path with the location and shape of the object to determine whether the object is in the planned path of the autonomous vehicle 120. The vehicle electronic processor 410 may visualize the planned path as a 3D point cloud in front of the autonomous vehicle 120. The vehicle electronic processor 410 may then determine whether any voxel of the detected object corresponds to a voxel of the planned path. For example, the vehicle electronic processor 410 may determine that the object is in the planned path when a predetermined number of voxels of the object correspond to the predetermined number of voxels in the planned path.

When the object is in the planned path, the method 700 includes altering, using the vehicle electronic processor 410, the planned path of the autonomous vehicle 120 (at block 750). The vehicle electronic processor 410 may determine an alternative path to avoid collision with the detected object. For example, the vehicle electronic processor 410 may introduce a slight detour or deviation in the planned path to avoid the detected object. When the object is not in the planned path, the method 700 includes continuing over the planned path of the autonomous vehicle 120 (at block 760). The vehicle electronic processor 410 does not introduce detours or deviation when an object is detected within the vicinity of the autonomous vehicle 120, but the object is not in a planned path of the autonomous vehicle 120. The autonomous vehicle 120 is therefore operable to navigate through oncoming traffic and congested areas while reducing unnecessary braking of the autonomous vehicle 120.

In some embodiments, the vehicle electronic processor 410 may also determine a trajectory of the object based on the fused point cloud. For example, the vehicle electronic processor 410 may determine, using the machine learning module 480, the trajectory of the object based, in part, on the classification of the object. The vehicle electronic processor 410 then determines whether the trajectory of the detected object coincides with the planned path. The vehicle electronic processor 410 may alter the planned path when the trajectory of the detected object coincides with the planned path even when the detected object is not currently in the planned path. In some embodiments, the vehicle electronic processor 410 may take a specific action based on the object classification even when the object is not in the planned path of the autonomous vehicle 120. For example, the vehicle electronic processor 410 may reduce the speed of the autonomous vehicle 120 when the object is a human or animal.

Figure 15:
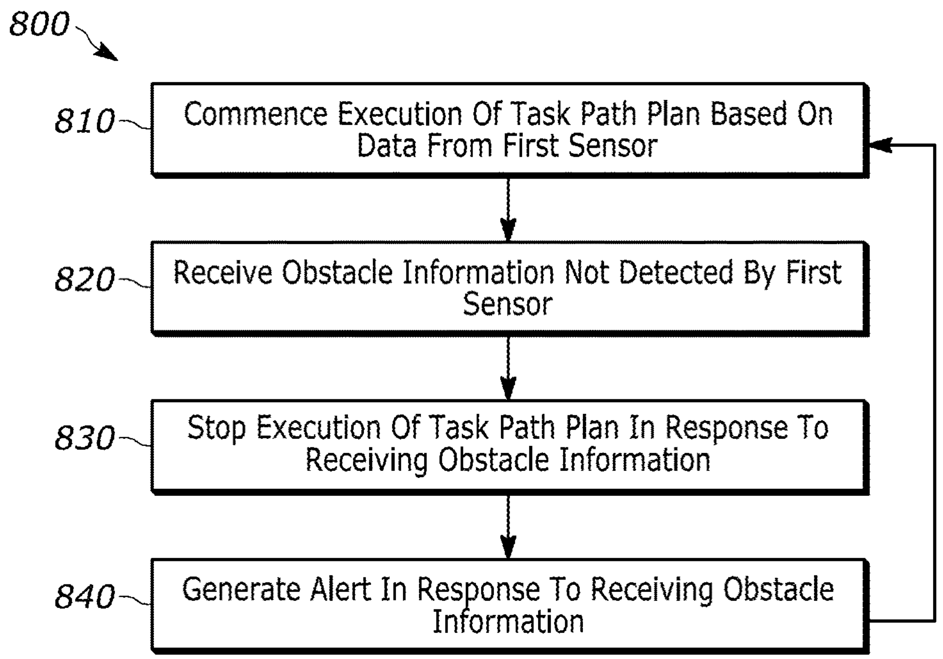
FIG. 15 is a flowchart of a method for obstacle handling by the autonomous vehicle of FIG. 3 in accordance with some embodiments.

FIG. 15 illustrates a flowchart of an example method 800 for obstacle handling. The method 800 may be performed by the autonomous vehicle 120. In the example illustrated, the method 800 includes commencing, using the vehicle electronic processor 410, execution of a task path plan based on data from a first sensor (at block 810). The task path plan includes, for example, a driving path between multiple locations and tasks performed at the multiple locations. The task path plan may be performed autonomously with minimal user input. The vehicle electronic processor 410 executes the task path plan using information from a first sensor, for example, the 3D long-range sensor 370, the obstacle depth sensor 380, and/or the video cameras 400. The first sensor is configured to detect obstacles in the vicinity or in the path of the autonomous vehicle 120.

The method 800 also includes receiving, from a second sensor, obstacle information not detected by the first sensor (at block 820). The obstacle information includes, for example, information relating to the presence of an obstacle in the vicinity or in the path of the autonomous vehicle 120. The first sensor and the second sensor may have overlapping coverage area such that the obstacle is detected in the overlapping coverage area. The second sensor is, for example, the obstacle planar sensors 390 provided towards the bottom of the autonomous vehicle 120. In some embodiments, the obstacle information may be received from a fused point cloud of the obstacle planar sensors 390 and the 3D long-range sensor 370. The obstacle information from the obstacle planar sensors 390 may combined with the 3D point cloud of the 3D long-range sensor 370 over the plane of detection of the obstacle planar sensors 390.

The method 800 includes stopping, using the vehicle electronic processor 410, execution of the task path plan in response to receiving the obstacle information (at block 830). The vehicle electronic processor 410 controls the vehicle actuator 460 to brake or stop operation of the autonomous vehicle 120 in response to receiving the obstacle information. The method 800 further includes generating, via the vehicle user interface, an alert in response to receiving the obstacle information (at block 840). The vehicle user interface is part of the vehicle input/output interface 440 and includes, for example, a warning light, a speaker, a display, and the like. The alert includes, for example, turning on of a warning light, emitting a warning sound (e.g., a beep), displaying a warning message, or the like.

In some embodiments, the autonomous vehicle 120 may also be operated remotely by a teleoperator. The teleoperator may operate the autonomous vehicle 120 using, for example, the fleet management server 110. In these embodiments, the images from the 3D image sensors, the video cameras 400, and the 3D point cloud may be displayed on a user interface of the fleet management server 110. The teleoperator may provide operating instructions or commands to the autonomous vehicle 120 over the communication network 140. In these embodiments, the vehicle electronic processor 410 may override teleoperator instructions or commands when an obstacle is detected in the trajectory or planned path of the autonomous vehicle 120. In some instances, the vehicle electronic processor 410 may override the operator instructions or commands when the attempted commands exceed provisioned limits associated with the autonomous vehicle 120 or the particular zone of operation of the autonomous vehicle 120. For example, acceleration and speed may be limited in certain zones and during certain maneuvers (e.g., turning corners at a particular radius). An autonomous operation model of the machine learning module 480 may be trained using the data gathered during, for example, remote operation of the autonomous vehicle 120 by the teleoperator. The autonomous operation model may be deployed when the autonomous operation model meets a predetermined accuracy metric. In some embodiments, during the training of the autonomous operation model, exceptions or unique circumstances may be handled by the teleoperator when the output of the autonomous operation model does not meet a confidence threshold.

In some instances, during autonomous operation of the autonomous vehicle 120, the autonomous vehicle 120, using the vehicle electronic processor 410, may request teleoperator control of the autonomous vehicle 120. For example, the global map may include designated zones (e.g., zones undergoing construction or renovation) in which autonomous operation of the autonomous vehicle 120 is prohibited.

Figure 16:
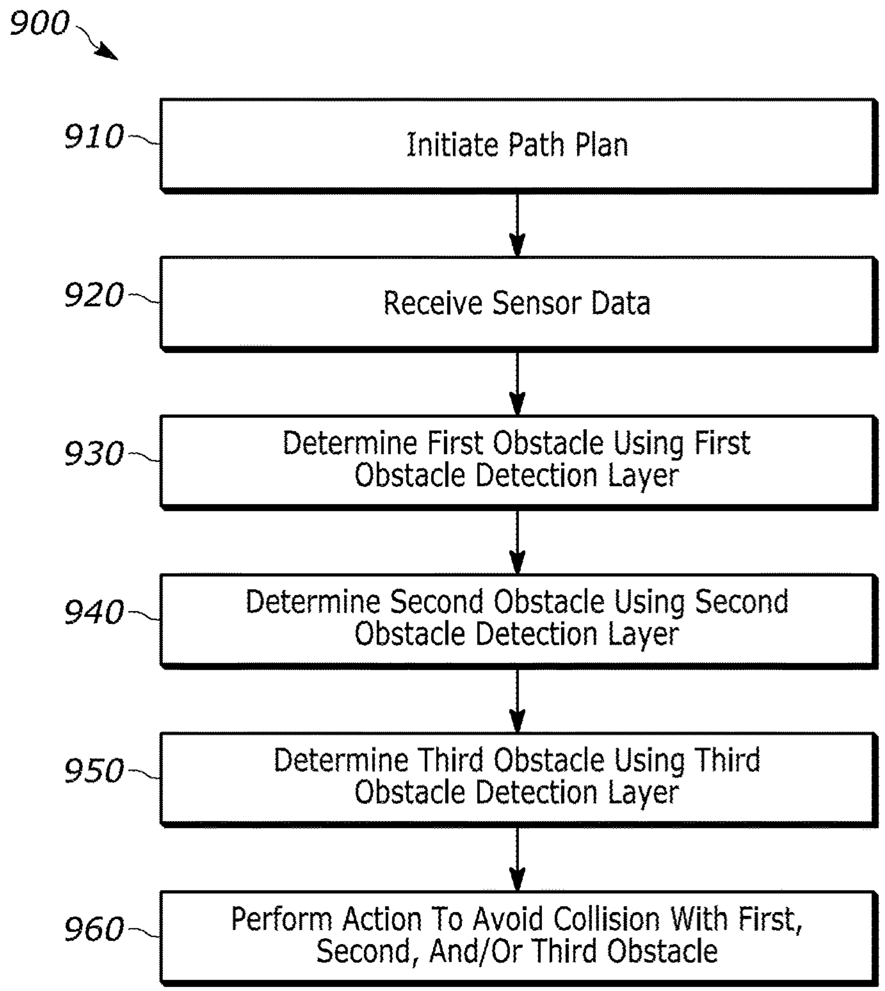
FIG. 16 is a flowchart of a method for multi-layer obstacle handling by the autonomous vehicle of FIG. 3 in accordance with some embodiments.

Referring now to FIG. 16, the autonomous vehicle 120 may implement an example multi-layer obstacle detection method 900 for detecting and avoiding obstacles in the planned path of the autonomous vehicle 120. The method 900 includes initiating, using the autonomous vehicle 120, a path plan for a task (at block 910). The path plan may be determined using any of the methods described above. The method 900 includes receiving, using the vehicle electronic processor 410, sensor data from the sensor(s) included in the autonomous vehicle 120 (at block 920). For example, the vehicle electronic processor 410 receives sensor data from the obstacle depth sensors 380, the obstacle planar sensors 390, and the like.

The method 900 also includes determining, using a first obstacle detection layer on the sensor data, a first obstacle in a planned path of the autonomous vehicle 120 based on a predicted trajectory of a detected object (at block 930). The first obstacle detection layer is, for example, a machine learning layer that is configured to detect obstacles based on a classification and prediction model. For example, the machine learning module 480 receives the sensor data and identifies and classifies objects detected in the sensor data. The machine learning module 480 may then predict the trajectory of the object and the trajectory of the autonomous vehicle 120 to determine whether a first obstacle (i.e., the detected and classified object) is in the planned path. The machine learning module 480 may consider a range between worst and best case parameters (e.g., speed, braking power, acceleration, steering power, etc.) to determine a likelihood of collision with a detected object. An example of the first obstacle detection layer detecting the first obstacle is described with respect to FIG. 17 below.

The method 900 also includes determining, using a second obstacle detection layer on the sensor data, a second obstacle in the planned path based on geometric obstacle detection (at block 940). The second obstacle detection layer is, for example, a geometric obstacle detection layer. For example, the vehicle electronic processor 410 may determine whether an obstacle occupies a volume of space (e.g., a voxel) in the sensor coverage region of the obstacle depth sensors 380. Specifically, the vehicle electronic processor 410 may generate a fused point cloud to detect obstacles in the planned path. The second obstacle detection layer is different from the first obstacle detection layer in that the second obstacle detection layer does not classify the objects detected. Rather, the second obstacle detection layer determines obstacles based on depth information regardless of the classification of the detected objects. An example of the second obstacle detection layer detecting the second obstacle is described with respect to FIG. 14 above. The second obstacle detection layer is more reliable than the first obstacle detection layer.

The method 900 also includes determining, using a third obstacle detection layer on the sensor data, a third obstacle in the planned path based on planar obstacle detection (at block 950). The third obstacle detection layer is, for example, a high-reliability safety system. For example, the vehicle electronic processor 410 may determine whether an obstacle is detected in one or more sensor slices sensed by the obstacle planar sensors 390. The high-reliability safety system includes considering only the measured and/or planned values of autonomous vehicle parameters to determine an obstacle in the planned path. The high-reliability safety system inhibits operation of the autonomous vehicle 120 outside of expected tolerances for various parameters. For example, the high-reliability safety system inhibits operation above or below expected tolerances of the speed limit, acceleration limits, braking limits, load limits, and/or the like. This allows the high-reliability safety system to only consider the measured and planned values rather than best or worst case scenarios in determining obstacles with a high-reliability. The third obstacle detection layer is more reliable than the first obstacle detection layer and the second obstacle detection layer. An example of the third obstacle detection layer detecting the second obstacle is described with respect to FIG. 18 below.

In response to detecting the at least one of the first, second, or third obstacles, the method 900 includes performing, using the vehicle electronic processor 410, an action to avoid collision with the at least of the first, second, or third obstacles in the planned path of the autonomous vehicle 120 (at block 960). The action includes, for example, altering the planned path of the autonomous vehicle 120, applying the brakes of the autonomous vehicle 120, applying the brakes of the autonomous vehicle 120, steering the autonomous vehicle 120 away from the obstacle, requesting teleoperator control of the autonomous vehicle 120, or the like.

In some instances, the vehicle electronic processor 410 performs a different action based on which obstacle detection layer is used to detect an obstacle. For example, the vehicle electronic processor 410 may alter the planned path differently in response to detecting the first obstacle using the first obstacle detection layer than in response to detecting the second obstacle using the second obstacle detection layer. The obstacle planar sensors 390 provide a third layer of collision prevention in the event that the vehicle electronic processor 410 does not detect an obstacle using the first obstacle detection layer or the second obstacle detection layer. Accordingly, in response to detecting the third obstacle using the third obstacle detection layer, the vehicle electronic processor 410 may apply the brakes of the autonomous vehicle 120 to stop operation of the autonomous vehicle 120.

Figure 17:
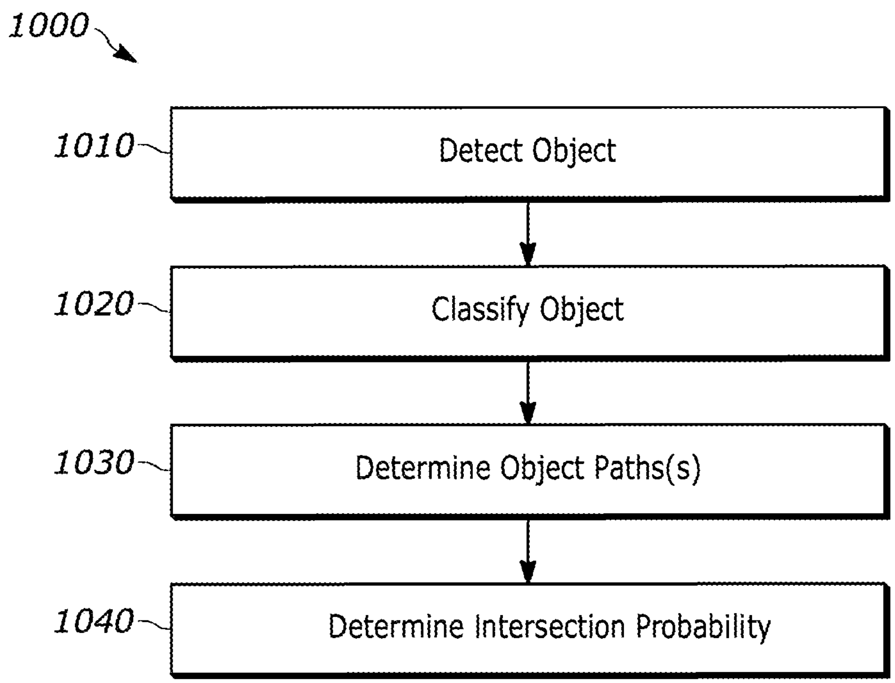
FIG. 17 is a flowchart of a method for predicting a collision by the autonomous vehicle of FIG. 3 in accordance with some embodiments.

FIG. 17 illustrates an example method 1000 for performing obstacle collision prediction (e.g., collision predicted described with respect to block 920 of the method 900). The obstacle collision prediction may be performed by the machine learning module 480. In the example, illustrated, the method 1000 includes detecting, using the machine learning module 480, an object near the autonomous vehicle 120 (at block 1010). The machine learning module 480 receives sensor data from the various obstacle sensors as described above. The sensor data includes image and/or video data of the surroundings of the autonomous vehicle 120. In some embodiments, the image and/or video data may include metadata providing GPS information, depth information, or the like.

The method 1000 includes identifying and/or classifying, using the machine learning module 480, the object (at block 1020). The machine learning module 480 identifies objects and classifies objects in the received sensor data. The machine learning module 480 may be trained on a data set prior to being used in the autonomous vehicle 120. In one example, the machine learning module 480 may be trained on objects that are most commonly found at an airport.

The method 1000 includes predicting, using the machine learning module 480, a trajectory of the object based on the classification of the object (at block 1030). The machine learning module 480 predicts one or more trajectories of the object based on a classification of the object and/or a direction of motion of the object. The trajectory of the object may depend on the type of object. For example, when the machine learning module 480 detects a bird or an animal, a predicted path of the bird or animal may also be detected based on the current path, direction, etc., of the bird or animal.

The method 1000 includes determining, using the machine learning module 480, a probability of intersection of the object and the planned path based on the predicted trajectory (at block 1040). Based on the prediction, the vehicle electronic processor 410 may determine a probability of collision with the object and the autonomous vehicle 120. The machine learning module 480 may use the worst case vehicle speed, vehicle acceleration, vehicle steering, and/or the like to determine whether the trajectory of the object and the trajectory of the autonomous vehicle 120 may lead to a collision. The machine learning module 480 may cycle through various scenarios to determine the likelihood of a collision. In some embodiments, an action may only be taken when the probability of collision is above a certain threshold or when a likelihood of collision is also detected using another system (e.g., the geometric based obstacle detection system, the high-reliability safety system, etc.).

Figure 18:
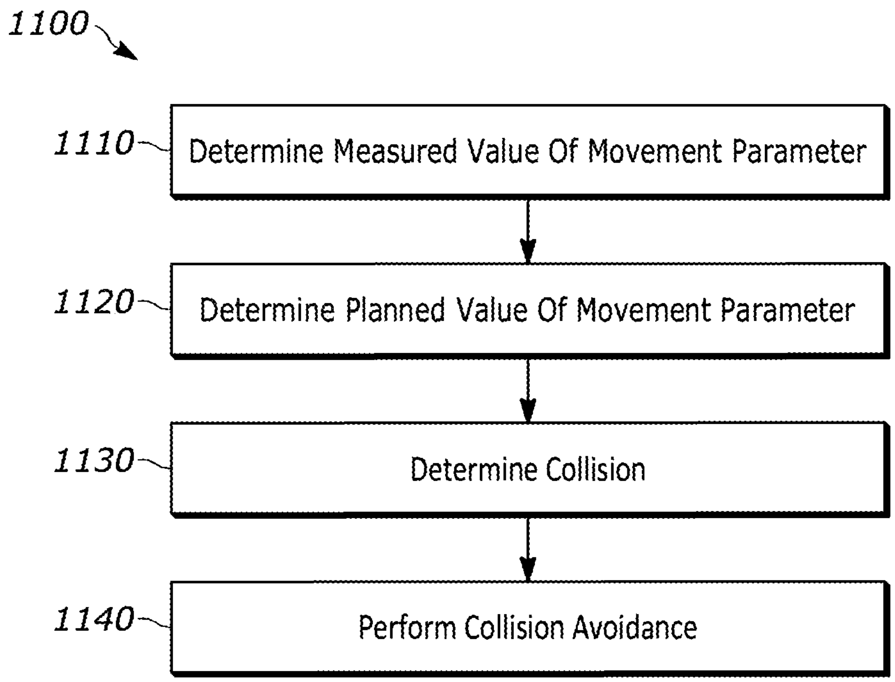
FIG. 18 is a flowchart of a method for performing obstacle collision avoidance by the autonomous vehicle of FIG. 3 in accordance with some embodiments.

FIG. 18 illustrates an example method 1100 for obstacle collision avoidance using a high-reliability safety system. The obstacle collision avoidance may be performed by the vehicle electronic processor 410. In the example illustrated, the method 1100 includes determining, using the vehicle electronic processor 410, a measured value of a movement parameter of the autonomous vehicle 120 (at block 1110). The measured value of a movement parameter is, for example, a current speed of the autonomous vehicle 120, a current acceleration/deceleration of the autonomous vehicle 120, a current direction of the autonomous vehicle 120, or the like. The movement parameters may be measured based on the current instruction or based on sensor readings (e.g., a tachometer, a compass, etc.).

The method 1100 also includes determining, using vehicle electronic processor 410, a planned value of a movement parameter of the autonomous vehicle 120 (at block 1120). The planned value of a movement is, for example, a planned speed of the autonomous vehicle 120, a planned acceleration of the autonomous vehicle 120, a planned direction of the autonomous vehicle 120, or the like. The vehicle electronic processor 410 determines the planned value of a movement based on, for example, the task path plan, speed limits in the environment surrounding the autonomous vehicle 120, etc.

The method 1100 includes determining, using the vehicle electronic processor 410, a potential collision based on an obstacle detected by one or more of the sensors included in the autonomous vehicle 120 and at least one of the measured value and the planned value (at block 1130). The vehicle electronic processor 410 may determine for each of the measured values and the planned values whether the obstacle would be in the planned path resulting in a potential collision with the obstacle. In some embodiments, the vehicle electronic processor 410 may also take into account the current trajectory of the obstacle in determining the potential collision.

In response to determining a collision, the method 1100 includes performing, using the vehicle electronic processor 410, an action to avoid the collision (at block 1140). The action may include applying the brakes of the autonomous vehicle 120, applying a steering of the autonomous vehicle 120, and/or the like.

The high-reliability safety system performs various actions to safely operate the vehicle around the airport. In some embodiments, the vehicle electronic processor 410 prevents collision with any stationary object by causing the autonomous vehicle 120 to aggressively apply the brakes when a potential collision is detected. The high-reliability system also uses a collection of overlapping sensors as described above to achieve redundant coverage to provide a higher level or reliability required for protection of human life. Sensor coverage is provided in multiple planes of coverage (e.g., see FIG. 10) to protect against objects on the ground and overhanding objects (e.g., an airplane engine, a crane or lift, ceilings of baggage receiving enclosures, etc.). The high-reliability safety system ensures that the autonomous vehicle 120 is stopped on power failure and the vehicle remains stationary when intentionally powered off. In some embodiments, the payload of the autonomous vehicle 120 may be fully enclosed inside the vehicle (i.e., no towing) to ensure full coverage and protection. The high-reliability system uses the sensors of the autonomous vehicle 120 to ensure that commanded movements actions are achieved within expected tolerances. This increases the reliability of potential collision determination. Additionally, the tolerances are set to avoid tupping, overly aggressive acceleration or velocity, and other control envelope failures.

The methods 500, 600, 700, 800, 900, 1000, and 1100 illustrate only example embodiments. The blocks described with respect to these methods need not all be performed or performed in the same order as described to carry out the method. One of ordinary skill in the art appreciates that the methods 500, 600, 700, 800, 900, 1000, and 1100 may be performed with the blocks in any order or by omitting certain blocks altogether.

Thus, embodiments described herein provide systems and methods for autonomous vehicle operation in an airport. Various features and advantages of the embodiments are set forth in the following aspects:

What is claimed is:

1. An autonomous vehicle for operation in an airport, the autonomous vehicle comprising:

a frame;

a platform coupled to the frame and configured to support a load;

an obstacle sensor positioned relative to the frame and configured to detect obstacles about the frame, wherein the obstacle sensor is configured to detect obstacles on a ground in a vicinity of the autonomous vehicle and overhanging obstacles that are above the ground in the vicinity of the autonomous vehicle; and an electronic processor coupled to the obstacle sensor and configured to perform at least three different obstacle detection methods to detect obstacles based on sensor data captured by the obstacle sensor, wherein a difference between the at least three different obstacle detection methods includes (i) processing sensor data from different types of obstacle sensors, (ii) processing the same sensor data from the obstacle sensor in different manners, or (iii) both (i) and (ii), operate the autonomous vehicle based on the obstacles detected by the obstacle sensor, determine a measured value of a movement parameter of the autonomous vehicle;

determine a planned value of the movement parameter of the autonomous vehicle;

determine a potential collision based on an obstacle detected by the obstacle sensor and at least one of the measured value and the planned value; and perform an action to avoid the potential collision, wherein the electronic processor is configured to perform the action in response to determining that at least two of the at least three different obstacle detection methods have detected the obstacle and determined the potential collision.

2. The autonomous vehicle of claim 1, wherein the action includes one selected from a group consisting of applying brakes of the autonomous vehicle and applying a steering of the autonomous vehicle.

3. The autonomous vehicle of claim 1, wherein the obstacle sensor includes a plurality of obstacle planar sensors positioned relative to the frame and configured to provide overlapping sensor coverage around the autonomous vehicle.

4. The autonomous vehicle of claim 3, wherein the obstacle sensor includes a plurality of obstacle depth sensors positioned relative to the frame and together configured to detect obstacles 360 degrees about the frame.

5. The autonomous vehicle of claim 4, wherein the electronic processor is further configured to:

detect obstacles in sensor data captured by the plurality of obstacle depth sensors; and receive, from one or more of the obstacle planar sensors, obstacle information not detected in the sensor data captured by the plurality of obstacle depth sensors.

6. The autonomous vehicle of claim 5, wherein the electronic processor is further configured to reduce a speed of the autonomous vehicle in response to receiving the obstacle information.

7. The autonomous vehicle of claim 5, wherein the electronic processor is further configured to generate an alert in response to receiving the obstacle information.

8. The autonomous vehicle of claim 1, wherein the electronic processor is configured to:

receive a global path plan of the airport;

receive task information for a task to be performed by the autonomous vehicle;

determine a task path plan based on the task information; and execute the task path plan by navigating the autonomous vehicle.

9. The autonomous vehicle of claim 8, wherein the obstacle sensor includes a three-dimensional long-range sensor and a three-dimensional image sensor, and wherein for executing the task path plan, the electronic processor is configured to:

receive three-dimensional point cloud information generated by the three-dimensional long-range sensor;

receive a three-dimensional image captured by the three-dimensional image sensor;

generate a fused point cloud based on sensor data received from the three-dimensional long-range sensor and the three-dimensional image sensor by matching voxels from the three-dimensional point cloud information with corresponding voxels from the three-dimensional image;

detect a first object based on the fused point cloud;

process obstacle information associated with the first object relative to a current position of the autonomous vehicle, wherein the obstacle information includes a shape and a location of the obstacle;

determine whether the first object is in a planned path of the autonomous vehicle;

in response to determining that the first object is in the planned path, alter the planned path to avoid the first object; and in response to determining that the first object is in a vicinity of the autonomous vehicle but not in the planned path, continue executing the planned path.

10. The autonomous vehicle of claim 9, further comprising a memory storing a machine learning module, wherein, using the machine learning module, the electronic processor is further configured to receive second sensor data from a third sensor, identify a second object in an environment surrounding the autonomous vehicle based on the second sensor data, and determine a classification of the second object.

11. The autonomous vehicle of claim 10, wherein using the machine learning module, the electronic processor is further configured to predict a trajectory of the second object based on the classification of the second object, predict, based on the trajectory, whether the second object will be an obstacle in a planned path of the autonomous vehicle, and in response to predicting that the second object will be the obstacle in the planned path of the autonomous vehicle, alter the planned path to avoid the obstacle.

12. The autonomous vehicle of claim 1, wherein the electronic processor is configured to perform a first obstacle detection method of the at least three different obstacle detection methods by determining, by processing the sensor data using the first obstacle detection method that includes using machine learning to detect the obstacle based on a classification of the obstacle, whether the obstacle is present in a planned path of the autonomous vehicle based on a predicted trajectory of the obstacle, wherein the electronic processor is configured to perform a second obstacle detection method of the at least three different obstacle detection methods by determining, by processing the sensor data using the second obstacle detection method that includes geometric obstacle detection based on depth information without classifying the obstacle, whether the obstacle is present in the planned path of the autonomous vehicle, and wherein the electronic processor is configured to perform a third obstacle detection method of the at least three different obstacle detection methods by determining, by processing the sensor data using the third obstacle detection method configured to evaluate data indicative of slices sensed by an obstacle planar sensor, whether the obstacle is present in the planned path of the autonomous vehicle, and wherein the electronic processor is configured to perform the action to avoid the potential collision with the obstacle in the planned path of the autonomous vehicle.

13. The autonomous vehicle of claim 12, wherein the electronic processor is configured to determine, using the first obstacle detection method, the classification of the obstacle, and determine the predicted trajectory at least based on the classification.

14. The autonomous vehicle of claim 13, wherein the action includes at least one selected from the group consisting of altering the planned path of the autonomous vehicle, applying brakes of the autonomous vehicle, and requesting teleoperator control of the autonomous vehicle.

15. The autonomous vehicle of claim 14, wherein the action is different depending on which of the at least three different obstacle detection methods detected the obstacle, and wherein the electronic processor is configured to alter the planned path of the autonomous vehicle in response to determining that the obstacle was detected by the first obstacle detection method, the second obstacle detection method, or both the first obstacle detection method and the second obstacle detection method, and apply the brakes of the autonomous vehicle in response to determining that the obstacle was detected by the third obstacle detection method.

16. An autonomous vehicle for operation in an airport, the autonomous vehicle comprising:

a frame;

a platform coupled to the frame and configured to support a load;

an obstacle sensor positioned relative to the frame and configured to detect obstacles about the frame, wherein the obstacle sensor is configured to detect obstacles on a ground in a vicinity of the autonomous vehicle and overhanging obstacles that are above the ground in the vicinity of the autonomous vehicle; and an electronic processor coupled to the obstacle sensor and configured to perform at least three different obstacle detection methods to detect obstacles based on sensor data captured by the obstacle sensor, wherein a difference between the at least three different obstacle detection methods includes (i) processing sensor data from different types of obstacle sensors, (ii) processing the same sensor data from the obstacle sensor in different manners, or (iii) both (i) and (ii), operate the autonomous vehicle based on the obstacles detected by the obstacle sensor, receive a global path plan of the airport;

receive task information for a task to be performed by the autonomous vehicle;

determine a task path plan based on the task information;

execute the task path plan by navigating the autonomous vehicle;

receive three-dimensional point cloud information generated by a three-dimensional long-range sensor;

receive a three-dimensional image based on images captured by one or more of a plurality of obstacle depth sensors;

generate a fused point cloud based on sensor data received from the three-dimensional long-range sensor and the one or more of the plurality of obstacle depth sensors by matching voxels from the three-dimensional point cloud information with corresponding voxels from the three-dimensional image;

detect an object based on the fused point cloud;

process obstacle information associated with the object relative to a current position of the autonomous vehicle, wherein the obstacle information includes a shape and a location of the object;

determine whether the object is in a planned path of the autonomous vehicle;

in response to determining that the object is in the planned path, alter the planned path to avoid the object; and in response to determining that the object is in a vicinity of the autonomous vehicle but not in the planned path, continue executing the planned path.

17. The autonomous vehicle of claim 16, wherein the global path plan is a global map of an airport including at least one selected form the group consisting of a drivable path, a location of a landmark, a traffic pattern, a traffic sign, a speed limit.

* * * * *